US012794630B2

(12) United States Patent
Su et al.

(10) Patent No.: US 12,794,630 B2
(45) Date of Patent: Nov. 10, 2026

(54) CONTENT OF CSI REPORT IN RACH PROCESS

(71) Applicant: Telefonaktiebolaget LM Ericsson (publ), Stockholm (SE)

(72) Inventors: Ling Su, Beijing (CN); Anqi He, Beijing (CN); Ritesh Shreevastav, Upplands Väsby (SE); Zhipeng Lin, Nanjing Jiangsu (CN); Robert Mark Harrison, Grapevine, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 868 days.

(21) Appl. No.: 17/925,087

(22) PCT Filed: May 14, 2021

(86) PCT No.: PCT/CN2021/093934
§ 371 (c)(1),
(2) Date: Nov. 14, 2022

(87) PCT Pub. No.: WO2021/228249
PCT Pub. Date: Nov. 18, 2021

(65) Prior Publication Data

US 2023/0189344 A1 Jun. 15, 2023

(30) Foreign Application Priority Data

May 15, 2020 (WO) ................ PCT/CN2020/090602

(51) Int. Cl.
*H04W 74/00* (2009.01)
*H04L 5/00* (2006.01)
(Continued)

(52) U.S. Cl.
CPC ........... *H04L 5/0051* (2013.01); *H04W 24/10* (2013.01); *H04W 74/0833* (2013.01); *H04W 74/0836* (2024.01)

(58) Field of Classification Search
None
See application file for complete search history.

(56) References Cited

U.S. PATENT DOCUMENTS

| | | | | |
|---|---|---|---|---|
| 2014/0295868 A1* | 10/2014 | Lee | ........................ | H04W 76/27 455/552.1 |
| 2019/0165847 A1* | 5/2019 | Kim | ..................... | H04B 7/0626 |

(Continued)

FOREIGN PATENT DOCUMENTS

| | | |
|---|---|---|
| WO | 2020030501 A1 | 2/2020 |
| WO | 2020032748 A1 | 2/2020 |

(Continued)

OTHER PUBLICATIONS

3GPP , "3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331 V16.0.0, Mar. 2020, 1-1048.

(Continued)

*Primary Examiner* — Minh Trang T Nguyen
(74) *Attorney, Agent, or Firm* — Murphy, Bilak & Homiller, PLLC

(57) ABSTRACT

This disclosure relates to Random Access (RA) procedures in communication networks, and in particular relates to the 4-step RA procedure and the 2-step RA procedure. The techniques described herein more specifically relate to the content of a channel state information report in a random access procedure. A method performed by a wireless device in a random access, RA, procedure comprises performing measurements of one or more reference signals transmitted (Continued)

by abase station. The method further comprises sending a first message to the base station in a Physical Uplink Shared Channel, PUSCH. The first message comprises a Channel State Information, CSI, report comprising information based on the measurements of the one or more reference signals.

24 Claims, 18 Drawing Sheets

(51) Int. Cl.

| | |
|---|---|
| ***H04W 24/10*** | (2009.01) |
| ***H04W 74/0833*** | (2024.01) |
| *H04W 74/0836* | (2024.01) |

(56) References Cited

U.S. PATENT DOCUMENTS

| | | | | |
|---|---|---|---|---|
| 2023/0198593 | A1* | 6/2023 | Zhang | H04B 7/0626 370/329 |
| 2023/0344569 | A1* | 10/2023 | Ji | H04L 5/0023 |

FOREIGN PATENT DOCUMENTS

| | | | |
|---|---|---|---|
| WO | 2020032750 | A1 | 2/2020 |
| WO | 2020032860 | A1 | 2/2020 |

OTHER PUBLICATIONS

3GPP, "3rd Generation Partnership Project; Technical Specification Group Radio Access Network; Evolved Universal Terrestrial Radio Access (E-UTRA); Requirements for support of radio resource management (Release 16)", 3GPP TS 36.133 V16.5.0, Mar. 2020, 1-3641.

3GPP, "3rd Generation Partnership Project; Technical Specification Group Radio Access Network; NR; Medium Access Control (MAC) protocol specification (Release 15)", 3GPP TS 38.321 V15.8.0, Dec. 2019, 1-78.

3GPP, "3rd Generation Partnership Project; Technical Specification Group Radio Access Network; NR; Physical layer procedures for control (Release 15) The present", 3GPP TS 38.213 V15.6.0, Jun. 2019, pp. 1-107.

3GPP, "3rd Generation Partnership Project; Technical Specification Group Radio Access Network; NR; Physical layer procedures for data (Release 16)", 3GPP TS 38.214 V16.1.0, Mar. 2020, 1-151.

3GPP, "3rd Generation Partnership Project; Technical Specification Group Radio Access Network; NR; Requirements for support of radio resource management (Release 16)", 3GPP TS 38.133 V16.2.0, Dec. 2019, 1-1129.

* cited by examiner

CONTENT OF CSI REPORT IN RACH PROCESS

INTRODUCTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

This disclosure relates to Random Access (RA) procedures in communication networks, and parts of this disclosure relate to the so-called 4-step RA procedure and the so-called 2-step RA procedure. 4-step RA and 2-step RA are described in New Radio (NR) Release (Rel) 15 and Release 16 respectively, and are discussed below, followed by an introduction of the reattempt of 'msg1' in the 4-step RA procedure applied in NR Release 15. NR supports both a 2-step and 4-step Random Access Channel (RACH).

4-step RA procedure in NR—A 4-step approach can be used for the random access procedure, and this is illustrated in FIG. 1. In this approach, the User Equipment (UE) detects a synchronization signal (SS) and decodes the broadcasted system information (SI), followed by transmitting a Physical Random Access Channel (PRACH) preamble (message 1—also shortened to 'msg1' herein) in the uplink. The eNB (the term used for a base station/radio access node in Long Term Evolution (LTE) networks)/gNB (the term used for a base station/radio access node in NR) replies with a Random Access Response (RAR) (message 2—also shortened to 'msg2' herein). The UE then transmits a UE identification (message 3—also shortened to 'msg3' herein) on a Physical Uplink Shared Channel (PUSCH).

The UE transmits PUSCH (message 3) after receiving a timing advance command in the RAR, allowing PUSCH to be received with a timing accuracy within the cyclic prefix (CP). Without this timing advance, a very large CP would be needed in order to be able to demodulate and detect PUSCH, unless the system is applied in a cell with very small distance between the UE and the eNB/gNB. Since NR will also support larger cells with a need for providing a timing advance to the UE, the 4-step approach is needed for random access procedure.

2-step RA procedure in NR— The 2-step random access procedure, also referred to as Type-2 random access procedure in the 3$^{rd}$ Generation Partnership Project (3GPP) document TS 38.213 is illustrated in FIG. 2. In the first step, a UE sends a message A (also shortened to 'msgA' herein) including the random access preamble together with higher layer data such as Radio Resource Connection (RRC) connection request possibly with some small payload on PUSCH. After detecting msgA, the network (NW), e.g. the gNB, sends the RAR (called message B—also shortened to 'msgB' herein) including information such as UE identifier assignment, timing advance information, and contention resolution message, etc.

Channel State Information (CSI) request in 4-step RA in NR Rel-15—In the RAR message in the 4-step RA procedure, the NW may include a CSI request. According to 3GPP TS 38.213 v15.6.0, Table 8.2-1 (reproduced below as Table 1), there is a bit reserved for that purpose.

TABLE 1

Random Access Response Grant Content field size

| RAR grant field | Number of bits |
|---|---|
| Frequency hopping flag | 1 |
| PUSCH frequency resource allocation | 14 |
| PUSCH time resource allocation | 4 |
| MCS | 4 |
| TPC command for PUSCH | 3 |
| CSI request | 1 |

However, there is no description of what that bit would be used for. The CSI request field was introduced in Narrowband (NB)-Internet of Things (IoT) in LTE, with the purpose to aid the Physical Downlink Control Channel (PDCCH) link adaptation: the UE would provide the NW with a CSI report in Msg3, which is described in 3GPP TS 36.133 and 3GPP TS 36.331.

CSI Feedback—CSI may consist of a Channel Quality Indicator (CQI), a precoding matrix indicator (PMI), a CSI-RS resource indicator (CRI), SS/PBCH Block Resource indicator (SSBRI), layer indicator (LI), rank indicator (RI), L1-RSRP or L1-SINR. If the UE can be configured with the higher layer parameter 'reportQuantity' set to 'cri-RSRP' or 'ssb-Index-RSRP', the UE shall report in a single report measurement of different CRI or SSBRI, which is described in 3GPP TS 38.214.

For L1-RSRP reporting, if a UE is configured to report RSRP for one reference signal (RS), the reported L1-RSRP value is defined by a 7-bit value in the range [−140, −44] dBm, with a 1 dB step size. Otherwise the UE shall use differential L1-RSRP based reporting, where the largest measured value of L1-RSRP is quantized to a 7-bit value in the range [−140, −44] dBm, with 1 dB step size, and the differential L1-RSRP is quantized to a 4-bit value. The differential L1-RSRP value is computed with a 2 dB step size with a reference to the largest measured L1-RSRP value that is part of the same L1-RSRP reporting instance. The mapping between the reported L1-RSRP value and the measured quantity is described in Chapter 10.1.6 of 3GPP TS 38.133 v16.2.0.

The CQI indices and their interpretations are given in Table 2 below as an example. Other tables are described in 3GPP TS 38.214.

The UE shall derive the highest CQI index which satisfies the following condition: a single Physical Downlink Shared Channel (PDSCH) transport block with a combination of modulation scheme, target code rate and transport block size corresponding to the CQI index, and occupying a group of downlink physical resource blocks termed the CSI reference resource, could be received with a transport block error probability not exceeding 0.1 or 0.00001 as higher layer configured.

TABLE 2

| 4-bit CQI Table | | | |
|---|---|---|---|
| CQI index | modulation | code rate × 1024 | Efficiency |
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16 QAM | 378 | 1.4766 |
| 8 | 16 QAM | 490 | 1.9141 |
| 9 | 16 QAM | 616 | 2.4063 |
| 10 | 64 QAM | 466 | 2.7305 |
| 11 | 64 QAM | 567 | 3.3223 |
| 12 | 64 QAM | 666 | 3.9023 |
| 13 | 64 QAM | 772 | 4.5234 |
| 14 | 64 QAM | 873 | 5.1152 |
| 15 | 64 QAM | 948 | 5.5547 |

Channel State Information Reference Signals (CSI-RS)—For CSI measurement and feedback, dedicated reference signals called CSI-RS are defined. A CSI-RS resource consists of between 1 and 32 CSI-RS ports and each port is typically transmitted on each transmit antenna (or virtual transmit antenna in case the port is precoded and mapped to multiple transmit antennas). The CSI-RS resource is used by a UE to measure a downlink channel between each of the transmit antenna ports and each of its receive antenna ports. The antenna ports are also referred to as CSI-RS ports. The supported number of antenna ports in NR are {1, 2, 4, 8, 12, 16, 24, 32}. By measuring the received CSI-RS, a UE can estimate the channel that the CSI-RS is traversing, including the radio propagation channel, potential precoding or beamforming, and antenna gains. The CSI-RS for the above purpose is also referred to as Non-Zero Power (NZP) CSI-RS but there are also zero power (ZP) CSI-RS used for other purposes than coherent channel measurements.

CSI-RS can be configured to be transmitted in certain Resource Elements (REs) in a slot and certain slots. FIG. 3 shows an example of a CSI-RS resource mapped to REs for 12 antenna ports, where 1 RE per Resource Block (RB) per port is shown.

In addition, an interference measurement resource for CSI feedback (CSI-IM) is also defined in NR for a UE to measure interference. A CSI-IM resource contains 4 REs, either 4 adjacent RE in frequency in the same Orthogonal Frequency Division Multiplexing (OFDM) symbol or 2 by 2 adjacent REs in both time and frequency in a slot. By measuring both the channel based on NZP CSI-RS and the interference based on CSI-IM, a UE can estimate the effective channel and noise plus interference to determine the CSI, i.e. rank, precoding matrix, and the channel quality.

Furthermore, a UE in NR may be configured to measure interference based on one or multiple NZP CSI-RS resources.

Random access resource selection—In NR up to Release 16, the UE selects a PRACH preamble associated with a SSB for which the SS-RSRP is above a RSRP threshold, but it may not be the best SSB, which is described in 3GPP TS 38.321. During the RACH procedure, the UE and network transmit and receive in the direction of a preamble-associated SSB beam.

There currently exist certain challenge(s). In NR up to Release 16, a UE selects a PRACH preamble associated with a SSB for which the SS-RSRP is above a RSRP threshold, but it may not be the best SSB. During the RACH procedure, the UE and network transmit and receive in the direction of a PRACH preamble-associated SSB beam. The best SSB is not reported until the UE is in a RRC_Connected state. There is no dedicated signalling from the network to inform the UE to start some measurement, or from the UE to report CSI before a RRC connection is set up.

In order to obtain early CSI, for example in msg3 of the 4-step RA procedure, it is required that the msg3 size is prolonged (increased) so that the CSI report can be accommodated. However, msg3 size can be only extended to a certain limit.

SUMMARY

Certain aspects of the present disclosure and their embodiments may provide solutions to these or other challenges. In particular, this disclosure provides techniques for supporting early CSI request and reporting during 4-step and 2-step RACH procedures. In certain embodiments, during a 4-step or 2-step RACH procedure, a UE reports the best 'N' SSBRI and/or CRI in an early CSI report in the msg3 PUSCH in the 4-step procedure or in the msgA PUSCH of the 2-step procedure. In certain embodiments, L1-RSRP, L1-RSRQ (Reference Signal Received Quality or Reference Symbol Received Quality), L1-SINR and CQI can also be reported. On receiving a CSI report, the network can take one or more actions, such as adjust the transmission beam, determine a Transport Block (TB) scaling factor, determine a PDCCH aggregation level (AL), determine a Modulation and Coding Scheme (MCS), etc.

In certain embodiments CSI resource configuration and reporting configuration are configured in System Information Block (SIB) 1 (SIB1).

In certain embodiments a CSI request field in msg2 RAR indicates 'N' and report quantities to trigger aperiodic early CSI reporting in msg3.

In certain embodiments the UE reports CSI reports of the best 'N' SSBRI/CRI and corresponding L1-RSRP, L1-RSRQ, L1-SINR, CQI in msg3 PUSCH or msgA PUSCH.

In certain embodiments, msg4 PDCCH or msgB PDCCH indicates a beam change for subsequent transmission.

Certain embodiments provide different ways to reduce CSI report payload.

Some of the embodiments described herein can be summarized according to the following numbered paragraphs:

Paragraph 1. (UE measures L1 CSI based on SSBs associated with the preamble and random access Occasion (RO) used for msg1 or msgA) A method in a UE of reporting channel state information (CSI) during a random access procedure, comprising a. measuring CSI using signals present in one or more SSBs, wherein each of the SSBs is associated with a RO,
b. transmitting a random access preamble associated in a RO associated with the SSB; and
c. transmitting a CSI report containing the CSI, wherein the SSB associated with the report is identified at least in part by the RO in which the preamble is transmitted.

Paragraph 2. (UE selects and reports on best one or more SSBs associated with the RO) The method of paragraph 1, further comprising selecting an SSB of a plurality of SSBs associated with the RO for which provide the CSI report, and transmitting an index in the report that identifies which of the plurality of SSBs associated with the RO is associated with the report.

Paragraph 3. The method of paragraph 1 or 2, wherein the CSI report comprises an indication of L1-RSRP, L1-RSRQ, L1-SINR, and CQI.

Paragraph 4. The method of any of paragraphs 1-3, wherein the UE transmits the CSI report within a msg3 or msgA PUSCH.

Paragraph 5. The method of any of paragraphs 1-4, further comprising a. receiving an indication of one at least one of i. a number of the CSI reports to transmit ii. which of SSBRI, SS-RSRP, SS-RSRQ, SS-SINR, and CQI should be reported; and b. transmitting one or more of the CSI reports according to the indication.

There are, proposed herein, various other embodiments which address one or more of the issues disclosed herein.

Certain embodiments may provide one or more of the following technical advantage(s). If early CSI reporting of, e.g., SSBRI, CRI, RSRP, RSRQ, SINR, CQI, etc. is available during a RACH procedure, efficient data transmission with a high spectral efficiency, and/or beam adjustment is possible as early as in msg4 of the 4-step procedure and in msgB of the 2-step procedure. The network can determine a msgB TB scaling factor, a msg4 PDCCH AL, a msg4 MCS, etc. based on an early CSI report rather than 'blindly' without this information.

BRIEF DESCRIPTION OF THE DRAWINGS

Various embodiments are described herein with reference to the following drawings, in which.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

This disclosure discusses CSI carried in an early CSI report. According to various CSI report quantities, generally three solutions are available, as described further below. Certain embodiments provide for the signaling of report quantities, methods to reduce early CSI report payload, and some higher layer enhancement. The methods disclosed in this disclosure consider both the signaling overhead, the flexibility and how much information of the early CSI is needed.

Figure 18:
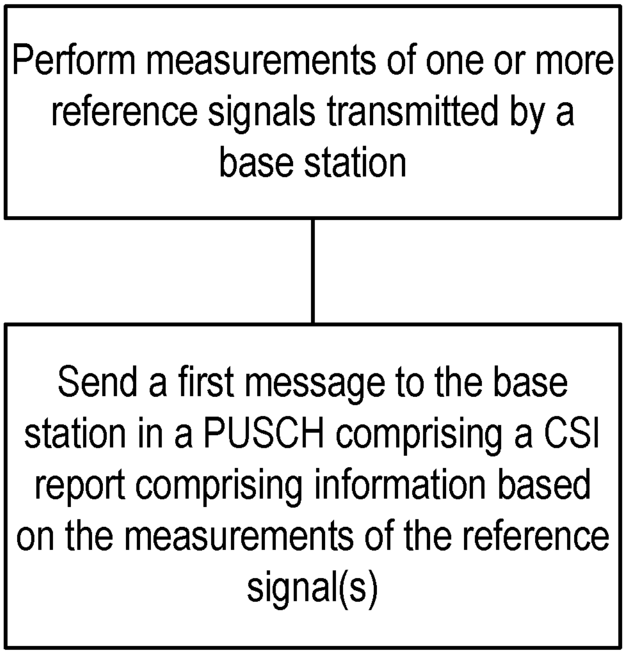
FIG. 18 is an illustration of method implemented in a terminal device in accordance with some embodiments.

As illustrated in FIG. 18, a method performed by a wireless device in a random access (RA) procedure is disclosed. The method comprises the wireless device performing measurements of one or more reference signals transmitted by a base station; and then sending a first message to the base station in a Physical Uplink Shared Channel, PUSCH, wherein the first message comprises a Channel State Information (CSI) report comprising information based on the measurements of the one or more reference signals. Detailed embodiments are described below.

Early CSI Report of SSBRI—4-Step RACH

Figure 1:
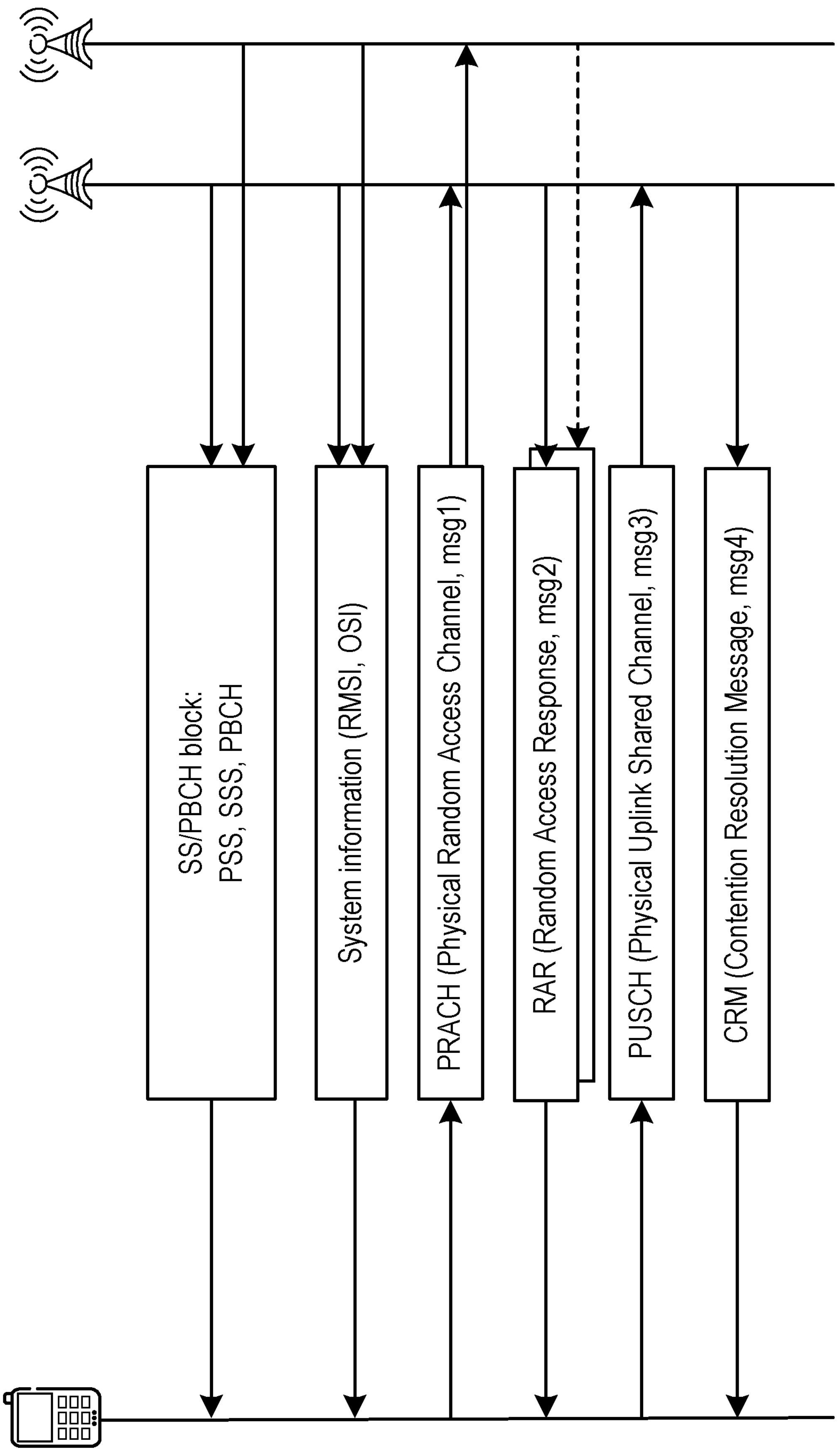
FIG. 1 illustrates a 4-step RA procedure.
Figure 2:
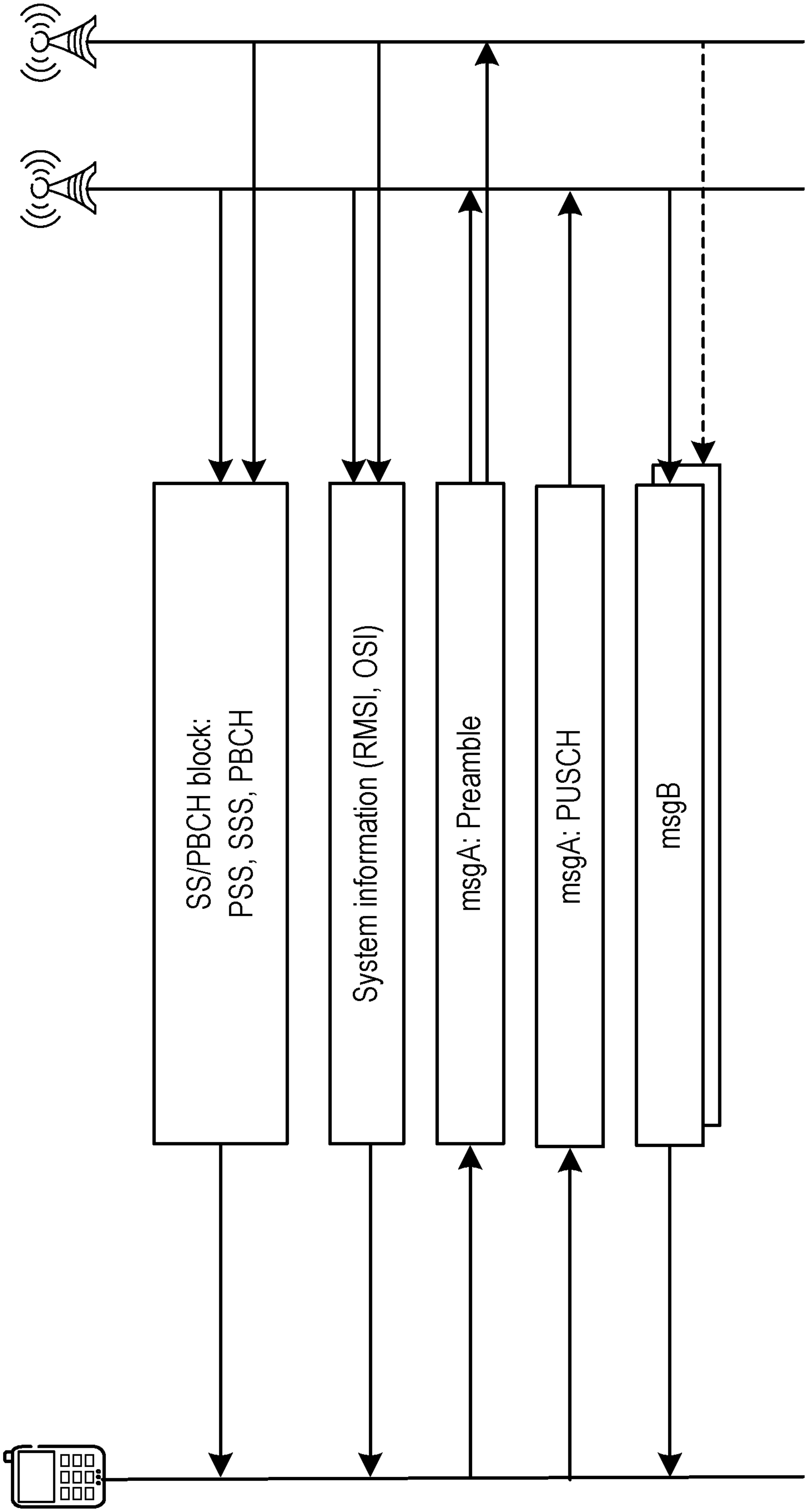
FIG. 2 illustrates a 2-step RA procedure.
Figure 3:
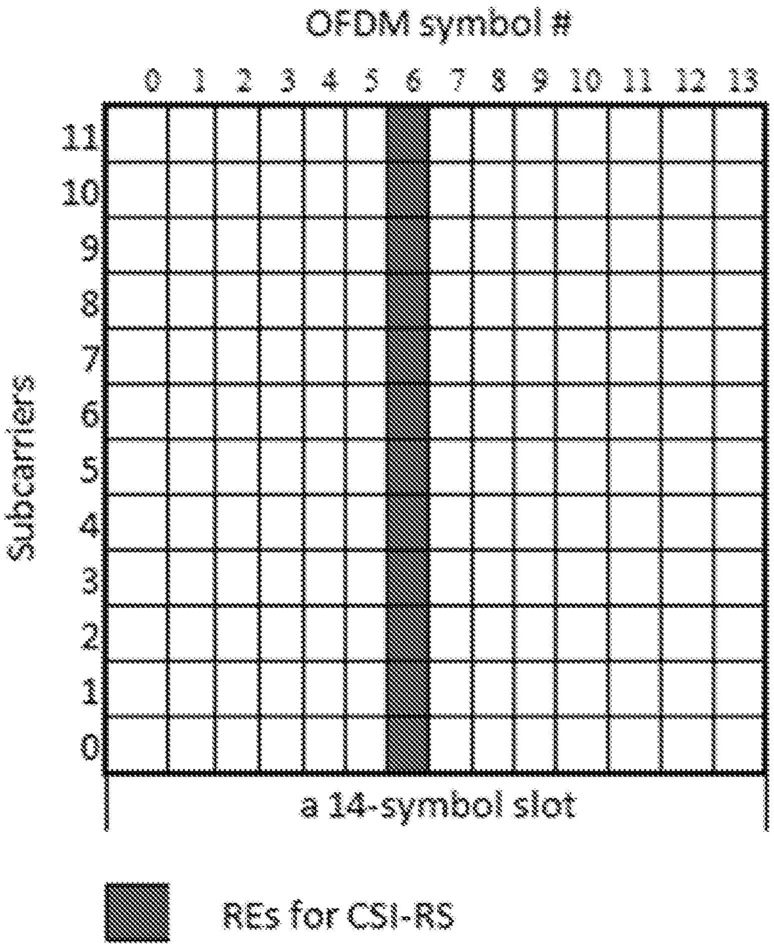
FIG. 3 is an exemplary mapping of a CSI-RS resource to REs for 12 antenna ports.
Figure 4:
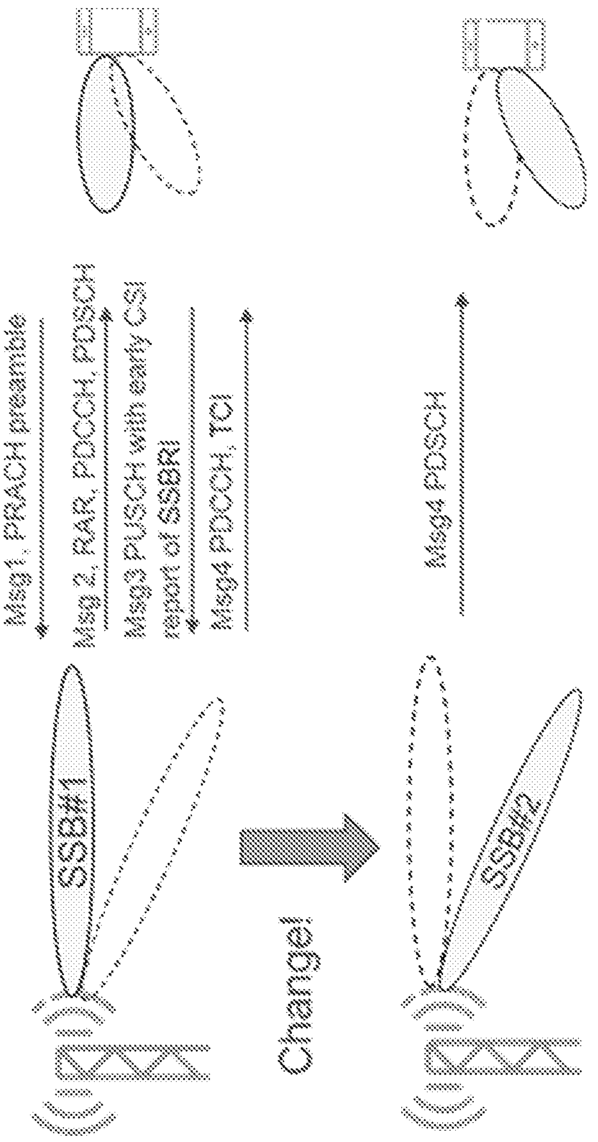
FIG. 4 illustrates an exemplary implementation of early CSI reporting of SSBRI in a 4-step RA procedure.

A first set of embodiments relate to implementation of early CSI reporting of SSBRI in a 4-step RA procedure, as illustrated in FIG. 4. FIG. 4 shows signalling between a UE and a base station in a 4-step RA procedure. In the case of 4-step RACH, SSB resource configuration and CSI reporting configuration for early CSI acquisition are configured in SIB1. The UE sends a PRACH preamble associated with a preferred SSB which is above a RSRP threshold (this is Msg1). The UE keeps measuring SSB.

The base station (network) can request an early CSI report via msg2 RAR, e.g. by setting a CSI request field as 1. Reporting quantities of 'N' SSBRI, L1-RSRP, L1-RSRQ, L1-SINR and CQI can be configured in SIB1 or msg2 RAR. N can be band specific.

In msg3 the UE reports up to the 'N' best SSBRI, and optionally the corresponding RSRP and/or CQI for those N best SSBRI. The base station determines the new downlink (DL) and/or uplink (UL) beam, MCS, TB scaling factor and PDCCH aggregation level for subsequent transmission based on CSI report. The base station (network) sends msg4 PDCCH which indicates a same or a new beam for msg4 PDSCH and msg4 HARQ-ACK, also known as Ack/Nack (NN). The base station (network) can indicate a SSB index which is 'Type D' Quasi Co-Located (QCL'ed) with a new beam in msg4 PDCCH in Downlink Control Information (DCI). The UE monitors PDCCH to get the DCI from msg4 PDCCH, then obtains the scheduled msg4 PDSCH. Then UE receives msg4 MAC PDU on the beam in msg4 PDSCH and decodes the MAC PDU. Alternatively the base station/network can indicate one Transmission Configuration Indicator (TCI) state with a particular SSB beam as a Type D QCL source RS for the new transmission beam. TCI states can be previously configured, e.g. in SIB1 or msg2 or fixed in a specification, as shown in Table 3 below. L is the number of configured SSB. The same beam as the PRACH preamble (msg1) is used from msg1 to msg4 PDCCH. The base station (network) and UE apply the new beam starting from msg4 PDSCH.

TABLE 3

| TCI states | | |
|---|---|---|
| TCI index | Source RS/RS set index | QCL type |
| 0 | SS/PBCH block #0 | D |
| 1 | SS/PBCH block #1 | D |
| . . . | . . . | . . . |
| L-1 | SS/PBCH block #L-1 | D |

If only the N best SSBRI are requested in the CSI report, then SSBRIs can be reported in order of descending RSRP quality, i.e. best SSBRI first.

In Rel-15 L1-RSRP reporting using SSBs, the UE is configured with a list of 6 bit ‘SSB-Indices’ to measure and report L1-RSRP upon. Before the UE is in a RRC connected state, it can’t be configured with such a list. Therefore, the UE must somehow determine which SSBs to measure and report in early CSI operation. While the UE is in idle state, according to Rel-15 operation, the UE measures one or more SSBs, selects one which is of sufficient quality, and transmits a RACH preamble associated with the SSB.

In embodiments of the present disclosure, and for example in the disclosed early CSI reporting procedure, this Rel-15 RACH preamble to SSB association may be additionally used to identify an SSB used, where the SSB is identified by the order that it is associated in the RACH occasion (RO) for which the UE makes the RACH attempt with Msg1 or MsgA. For example, assume that a given RACH occasion is associated with 4 SSBs and 64 RACH preambles are in the RO. Then the first SSB is associated with preambles 0 to 15, and that SSB has index 0 for L1-RSRP reporting in early CSI, while the SSB with L1-RSRP reporting index 1 is associated preambles 16 to 31 in the RO, and the last two SSB reporting indices of 2 and 3 are associated with preambles 32 to 47 and 48 to 63, respectively. Because the base station/network is aware of the SSB association with the ROs, even though the SSBs associated with a given RO may vary over time, zero or a small number of bits are needed to identify the SSB measured in the early CSI report, which saves L1-RSRP reporting overhead.

Thus, in summary of the above, in some embodiments the SSB that the early CSI report pertains to is identified via the RO and/or the preamble used in the initial access. Although described above reference to the 4-step RA procedure, it will be appreciated that this can also be applied to the 2-step RA procedure so that the base station can identify the SSB that the early CSI report pertains to based on the RO and/or the preamble used in the initial access.

In some embodiments, a UE measures physical layer CSI based on SSBs associated with the preamble and RO used for Msg1 or MsgA. The UE reports channel state information (CSI) during a random access procedure. The UE measures CSI using signals present in one or more SSBs, wherein each of the SSBs is associated with a random access occasion (RO). The UE further transmits a random access preamble associated in an RO associated with the SSB. It also transmits a CSI report containing the CSI, wherein the SSB associated with the report is identified at least in part by the RO in which the preamble is transmitted. The UE may further transmit an index in the report that identifies which SSB associated with the RO is associated with the report.

Thus, in the first set of embodiments, for 4-step RACH, the N best SSBRI, and/or corresponding L1-RSRP, and/or corresponding L1-RSRQ, and/or corresponding L1-SINR and/or corresponding CQI is reported in msg3 PUSCH. Here, N is the number of reference signals to be reported, which can be a predetermined value, or configured in RRC signaling (e.g. in SIB1), or configured in DCI for scheduling RAR, or in the RAR (Msg2).

Early CSI Report of SSBRI— 2-Step RACH

Figure 5:
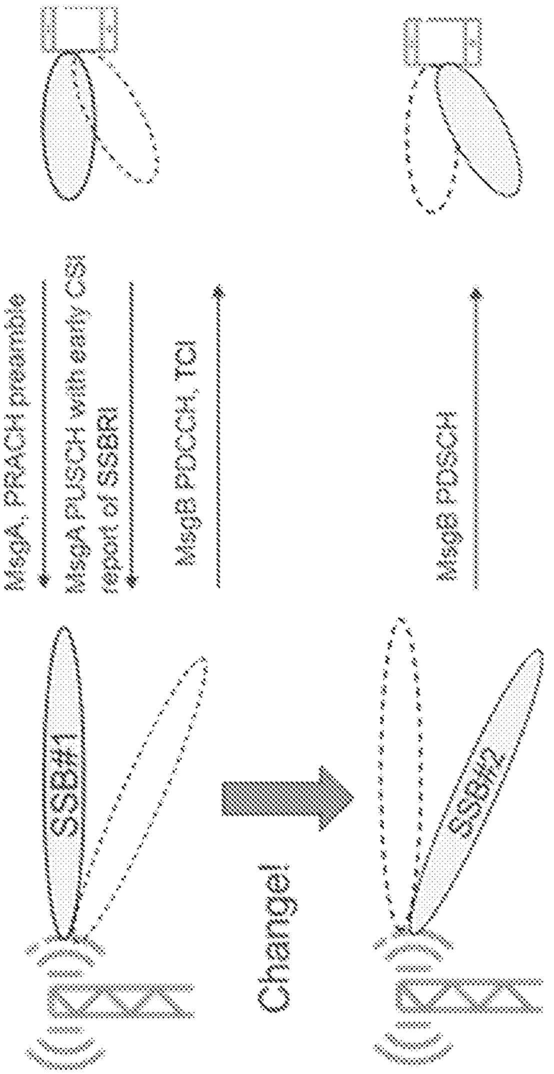
FIG. 5 illustrates an exemplary implementation of early CSI reporting of SSBRI in a 2-step RA procedure.

A second set of embodiments relate to implementation of early CSI reporting of SSBRI in a 2-step RA procedure, as illustrated in FIG. 5. FIG. 5 shows signalling between a UE and a base station in a 2-step RA procedure. In the case of 2-step RACH, SSB resource configuration and CSI reporting configuration for early CSI acquisition are configured in SIB1. Reporting quantities can be ‘N’ SSBRI, and optionally the corresponding L1-RSRP, L1-RSRQ, L1-SINR and CQI. SIB1 also indicates if early CSI reporting is activated for 2-step RACH. The UE sends msgA PRACH preamble associated with a preferred SSB which is above a RSRP threshold. The UE keeps measuring SSB and reports up to N best SSBRI, L1-RSRP, L1-RSRQ, L1-SINR and CQI in msgA PUSCH. The best SSBRI in msgA PUSCH may be different from the one that the PRACH preamble is associated with, given sufficient time between msgA RACH preamble and msgA PUSCH. The base station (network) determines the new DL and UL beam, MCS, TB scaling factor and PDCCH aggregation level for subsequent transmission. The base station (network) sends msgB PDCCH which indicates the same or a new beam for msgB PDSCH and msgB NN. MsgB PDCCH uses the same beam as msgA. The base station (network) and the UE apply the new beam starting from msgB PDSCH. If only the N best SSBRI are requested in the CSI report, the SSBRIs are reported in order of descending RSRP quality, i.e. best SSBRI first.

Thus, in the second set of embodiments, for 2-step RACH, the N best SSBRI, and/or corresponding L1-RSRP, and/or corresponding L1-RSRQ, and/or corresponding L1-SINR and/or corresponding CQI is reported in msgA PUSCH. Here N is the number of reference signals to be reported, which can be a predetermined value, or configured in RRC signaling, e.g. in SIB1.

Early CSI Report of CRI—4-Step RACH

Figure 6:
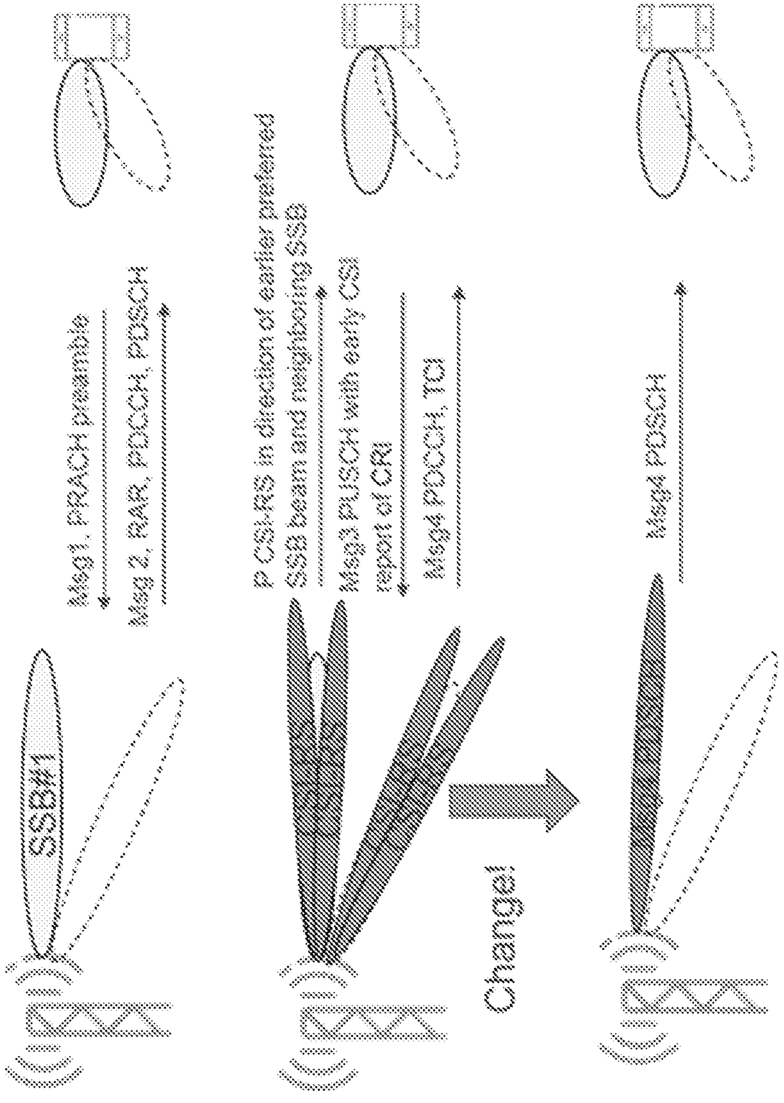
FIG. 6 illustrates an exemplary implementation of early CSI reporting of CRI in a 4-step RA procedure.

A third set of embodiments relate to implementation of early CSI reporting of CRI in a 4-step RA procedure, as illustrated in FIG. 6. FIG. 6 shows signalling between a UE and a base station in a 4-step RA procedure. In the case of 4-step RACH, periodic CSI-RS resource configuration and CSI reporting configuration for early CSI acquisition are configured in SIB1. The UE sends a PRACH preamble associated with a preferred SSB which is above a RSRP threshold. The UE keeps measuring SSB.

The base station (network) activates early CSI reporting via msg2 RAR, e.g. by setting a CSI request field as 1. Reporting quantities of ‘N’ CRI, L1-RSRP, L1-RSRQ, L1-SINR and CQI can be configured in SIB1 or msg2 RAR. N can be band specific. The base station (network) can send aperiodic CSI-RS resources in the directions of one or several SSB beams, e.g. a preamble associated SSB beam and its neighboring SSB beams. CSI-RS resource configuration is activated in msg2 RAR.

In msg3 the UE reports up to the 'N' best CRI, and optionally the corresponding L1-RSRP, L1-RSRQ, L1-SINR and CQI. The base station (network) determines the new DL and UL beam, MCS, TB scaling factor and PDCCH aggregation level for subsequent transmission. The base station (network) sends msg4 PDCCH which indicates same or a new beam for msg4 PDSCH and msg4 A/N. The base station (network) can indicate a CRI which is Type D QCL'ed with a new beam in msg4 PDCCH in DCI. Alternatively, the base station (network) can indicate one TCI state with a particular CSI-RS beam as a Type D QCL source RS for new transmission beam. TCI states are previously configured, e.g. in SIB1 or msg2 or fixed in a specification. The same beam as the PRACH preamble is used from msg1 to msg4 PDCCH. The base station (network) and the UE apply the new beam starting from msg4 PDSCH. If only the N best CRI are requested in the CSI report, the CRIs are reported in order of descending RSRP quality, i.e. best CRI first.

Another alternative is that the base station (network) requests a CSI report of both SSBRI and CRI simultaneously and corresponding L1-RSRP, CQI. This means network can limit CSI-RS in direction of certain SSB beams and reduce CSI-RS resources.

Thus, in the third set of embodiments, for 4-step RACH, the N best CRI, and/or corresponding L1-RSRP, and/or corresponding L1-RSRQ, and/or corresponding L1-SINR and/or corresponding CQI is reported in msg3 PUSCH. Here, N is the number of reference signals to be reported, which can be a predetermined value, or configured in RRC signaling (e.g. in SIB1), or configured in DCI for scheduling RAR, or in the RAR.

Early CSI Report of SSBRI—2-Step RACH

Figure 7:
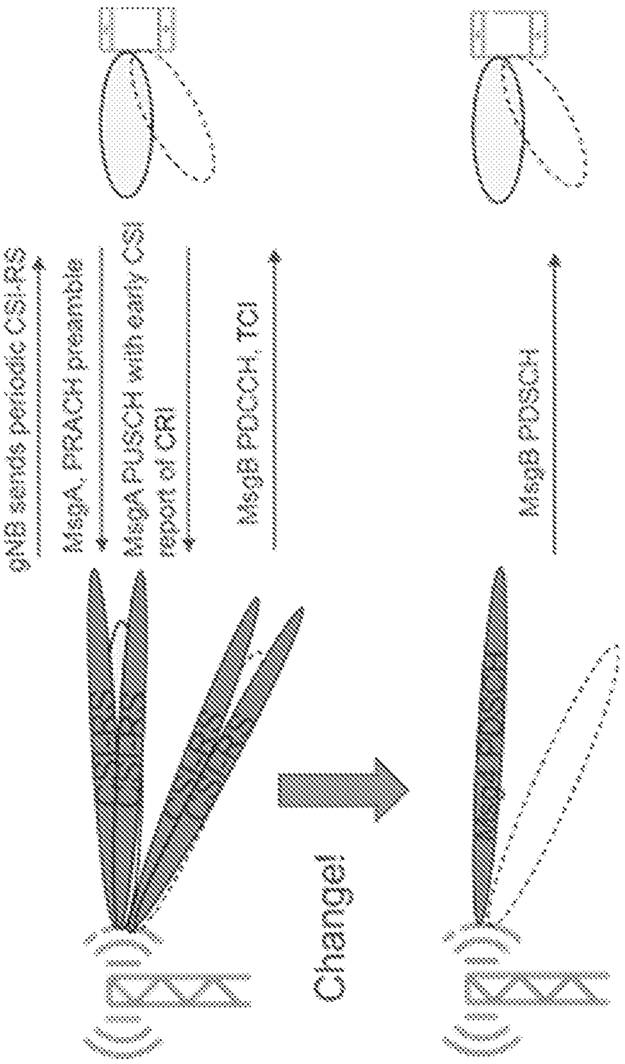
FIG. 7 illustrates an exemplary implementation of early CSI reporting of CRI in a 2-step RA procedure.

A fourth set of embodiments relate to implementation of early CSI reporting of SSBRI in a 2-step RA procedure, as illustrated in FIG. 7. FIG. 7 shows signalling between a UE and a base station in a 2-step RA procedure. In the case of 2-step RACH, periodic CSI-RS resource configuration and CSI reporting configuration for early CSI acquisition are configured in SIB1. Reporting configuration includes quantities of N CRI, L1-RSRP, L1-RSRQ, L1-SINR and CQI. SIB1 also indicates if early CSI report is activated for 2-step RACH. The UE sends a msgA PRACH preamble associated with a preferred SSB which is above a RSRP threshold. The UE keeps measuring CSI-RS and sends a CSI report of up to N best CRI, L1-RSRP, L1-RSRQ, L1-SINR and CQI in msgA PUSCH.

The base station (network) determines the new DL and UL beam, MCS, TB scaling factor and PDCCH aggregation level for subsequent transmission. The base station (network) sends msgB PDCCH which indicates the new beam for msgB PDSCH and msgB NN. MsgB PDCCH uses the same beam as msgA. The base station (network) and UE apply the new beam starting from msgB PDSCH. If only the N best CRI are requested in the CSI report, the CRIs are reported in order of descending RSRP quality, i.e. best CRI first.

Another alternative is the base station (network) requests a CSI report of both SSBRI and CRI simultaneously and corresponding L1-RSRP, L1-RSRQ, L1-SINR, CQI. This means network can limit CSI-RS in direction of certain SSB beams and reduce CSI-RS resources.

Thus, in the fourth set of embodiments, for 2-step RACH, the N best CRI, and/or corresponding L1-RSRP, and/or corresponding L1-RSRQ, and/or corresponding L1-SINR and/or corresponding CQI is reported in msgA PUSCH. Here, N is the number of reference signals to be reported, which can be a predetermined value, or configured in RRC signaling (e.g. in SIB1).

Early CSI Report of Both SSBRI and CRI—4-Step RACH

Figure 8:
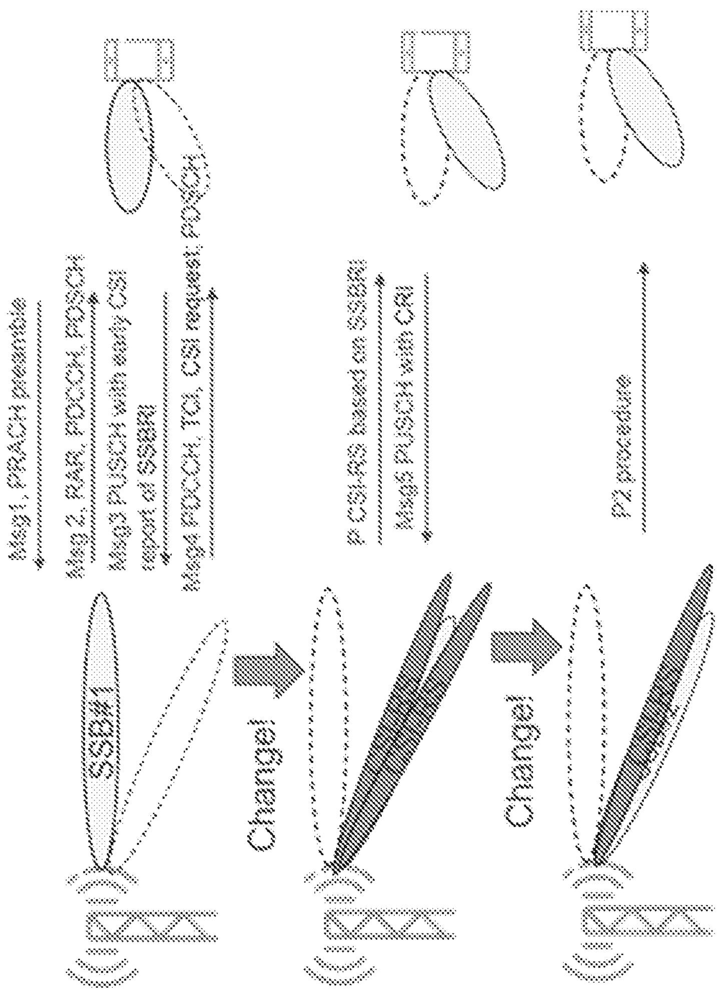
FIG. 8 illustrates an exemplary implementation of early CSI reporting of SSBRI and CRI in a 4-step RA procedure.

A fifth set of embodiments relate to implementation of early CSI reporting of SSBRI and CRI in a 4-step RA procedure, as illustrated in FIG. 8. FIG. 8 shows signalling between a UE and a base station in a 4-step RA procedure. In the case of 4-step RACH, periodic CSI resource configuration and CSI reporting configuration for early CSI acquisition are configured in SIB1. The UE sends a PRACH preamble associated with a preferred SSB which is above a RSRP threshold. The UE keeps measuring SSB.

The base station (network) requests early CSI reporting via msg2 RAR, e.g. by setting a CSI request field as 1. Reporting quantities of N SSBRI, L1-RSRP, L1-RSRQ, L1-SINR and CQI can be configured in SIB1 or msg2 RAR. N can be band specific.

In msg3 the UE reports up to the 'N' best SSBRI, corresponding L1-RSRP, L1-RSRP, L1-SINR and CQI. The base station (network) sends msg4 PDCCH which indicates a same or a new transmission beam, requests CSI report of CRI, L1-RSRP, L1-RSRQ, L1-SINR and CQI and activates aperiodic CSI-RS resource configuration.

Msg4 PDSCH can be sent in the same beam as msg4 PDCCH or in the new beam. The base station (network) sends aperiodic CSI-RS based on the best SSBRI. The UE reports CRI in CSI report in msg5 PUSCH. The base station (network) adjusts the transmission beam, e.g. by using an existing P2 beam refinement procedure.

Thus, in the fifth set of embodiments, the N best SSBRI, and/or corresponding L1-RSRP, and/or corresponding L1-RSRQ, and/or corresponding L1-SINR and/or corresponding CQI is reported in msg3 PUSCH. Here N is the number of reference signals to be reported, which can be a predetermined value, or configured in RRC signaling (e.g. in SIB1), or can be associated to the frequency band. In addition, the 'M' best CRI are reported in a PUSCH after msg3, where 'M' can be a predetermined value, or configured in RRC signaling (e.g. in SIB1), or signaled in DCI, or can be associated to the frequency band. With this embodiment, the UE complexity can be reduced since only SSB based or CSI-RS based measurement reports are required to be transmitted at the same time.

In a variant of the fifth set of embodiments, the N best SSBRI or CRI, and/or corresponding L1-RSRP, and/or corresponding L1-RSRQ, and/or corresponding L1-SINR and/or corresponding CQI are reported in msg3 or MsgA PUSCH, where 'N' is the number of reference signals (either SSB or CSI-RS) to be reported, which can be a predetermined value, or configured in RRC signaling (e.g. in SIB1), or configured in DCI, or can be associated to the frequency band. With this embodiment, SSB and CSI-RS are treated equally, and only the N best RS resources are reported.

'N' and 'Report Quantities' Fields in RAR UL Grant and msgA PUSCH

In certain embodiments, for 4-step RACH, a RAR UL grant can contain fields for 'N', and 'Report quantities' to indicate a number of reference signals and which quantities the UE should report in early CSI reporting in msg3. The size of early CSI report to be reported in msg3 can be determined by the two fields. N indicates the number of reference signals, as defined in exemplary Table 4 below:

TABLE 4

| N indicator | |
|---|---|
| N | Number of best SSBRI/CRI in early CSI report |
| 00 | 1 |
| 01 | 2 |
| 10 | 3 |
| 11 | 4 |

The CSI request field in msg2 RAR, which is reserved in Rel-15 and Rel-16, can be used to indicate report quantities. Table 5 below provides examples of report quantity indicators.

TABLE 5

| report quantities indicator | |
|---|---|
| Value of 'Report quantities' in RAR UL grant | Report quantities |
| 000 | Early CSI report is not requested. |
| 001 | early CSI report of SSBRI |
| 010 | early CSI report of SSBRI, SS-RSRP |
| 011 | early CSI report of SSBRI, SS-RSRP, SS-RSRQ, SS-SINR |
| 100 | early CSI report of SSBRI, SS-RSRP, SS-RSRQ, SS-SINR, CQI |
| 101 | early CSI report of CRI |
| 110 | early CSI report of CRI, CSI-RSRP |
| 111 | early CSI report of CRI, CSI-RSRP, CSI-RSRQ, CSI-SINR, CQI |

In other embodiments, if the number of reported signals equals to number of SSB, or if the UE is configured to report all SSB in the RO associated with the PRACH preamble, the UE reports RSRP of SSB in increasing SSB index. Then SSBRI can be saved.

In other embodiments, group-based beam reporting can also be configured to reduce payload, if the base station (network) configures the UE to report more than the 2 best SSBRI/CRI.

In other embodiments, CQI in early CSI reporting can be restrained to select from a subset of current 4-bit CQI tables. For example, if the UE can be configured to report even CQI indices in early CSI reports, a 4-bit value representing 0 to 15 can be reduced to a 3-bit value.

In other certain embodiments, in the case of 2-step RACH, N and report quantities are included in msgA PUSCH to indicate the number of reference signals and which report quantities UE sent in concurrent early CSI report. The size of early CSI reports in msgA PUSCH can be determined by the two fields. N and Report quantities can reuse the examples provided in Tables 4 and 5 above.

Early CSI Report Payload Reduction

To reduce the payload of early CSI reports in msg3 and msgA, some mechanisms can be taken to achieve the reliability of CSI reception and PUSCH reception.

In some embodiments, SSBRI bit length can depend on the number of transmitted SSBs, rather than 6 bits for a maximum of 64 SSB.

The inOneGroup field in SIB1 indicates which SSBs are really transmitted and it also indicates the total number of transmitted SSBs. If, for example, 4 SSB are transmitted, a 2-bit SSBRI can be reported in early CSI reporting representing SSB index 0~3, rather than 6 bits.

In other embodiments, the number of reported L1-RSRP can be less than the number of reported SSBRI/CRI. The largest and differential L1-RSRP bit length can be shortened by a larger step size or a smaller total range. For example, the current 7-bit L1-RSRP in the range [−140, −44] dBm with 1 dB step size can be reduced to a 6-bit value with 2 dB step size and 5-bit value with 3 dB step size for the same range. Currently the 4-bit value of differential L1-RSRP with 2 dB step size represents an offset of [0, 2, . . . , 28, ≥30] dB with respect to the largest L1-RSRP. The 4-bit value can be reduced to 3 bits, if the step size is 4 dB and offset range is [0, . . . , 24, ≥28] dB.

In other embodiments, the UE can be configured to measure all SSBs in the RO associated with the PRACH preamble or the one SSB which is associated with PRACH preamble.

In other embodiments, the number of SSBs considered for early CSI reporting can be the set of SSBs associated to the PRACH occasion selected by the UE when the number of SSBs per RO configured is more than 1.

It will be appreciated that any two or more of the above embodiments for reducing the payload of early CSI reports can be used in combination.

Although the above embodiments have been described with reference to payload reduction for early CSI reports, it will be appreciated that these embodiments can also be used for payload reduction for normal CSI reports (i.e. CSI reports that are not sent early).

Early CSI Report with Extended Msq3 Size

In the above sections for early CSI, it is assumed that the base station (NW) provides a larger UL grant so it is possible for the UE to fit the early CSI report.

The early CSI report can be accommodated in a RRC payload or in a Medium Access Control (MAC) Protocol Data Unit (PDU). It is possible to define a MAC subheader with a new Logical Channel Indicator (LCID) and the payload for this would contain the CSI report.

In some embodiments the base station (NW) provides a list of information in the SIB that the UE shall include in Msg3 and/or MsgA PUSCH.

From the base station (NW) perspective, it may be desired to obtain early CSI reporting in msg3 or MsgA PUSCH of any of RSRP; RSRQ; SINR; Channel Quality Indicator; Best SSB Beam Index; Indication of whether UE is in cell edge or poor coverage; if Msg4 should be sent using the same beam or different than that was used for Msg2.

As the msg3 size is limited, it may not be possible to accommodate all the information.

The base station (NW) can prioritize which of the metric(s) is/are most important, or how many metrics can be accommodated, and indicates that in the SIB or msg2 (RAR). The UE can perform the measurement(s) just before initiating the RACH procedure (sending msg1 preamble) and can include the measurement in Msg3.

Further, it may be possible for the UE also to perform the measurement after receiving Msg2 and before sending Msg3.

In some embodiments the base station (NW) may indicate in Msg2 that a delayed Msg3 is allowed so that the UE may perform measurement(s) during that (delay) time.

In other embodiments, the base station (NW) may indicate in SIB1 that a delayed Msg3 after msg2 is allowed so that the UE may perform measurement(s) during that time.

Utilizing a Spare 1 Bit in Current RRC Message

Currently there is one spare bit available in RRC, as shown below.

```
-- ASN1START
-- TAG-RRCSETUPREQUEST-START
RRCSetupRequest ::=            SEQUENCE {
   rrcSetupRequest                RRCSetupRequest-IEs
}
RRCSetupRequest-IEs ::=        SEQUENCE {
   ue-Identity                    InitialUE-Identity,
   establishmentCause             EstablishmentCause,
   spare                          BIT STRING (SIZE (1))
}
InitialUE-Identity ::=         CHOICE {
   ng-5G-S-TMSI-Part1             BIT STRING (SIZE (39)),
   randomValue                    BIT STRING (SIZE (39))
}
EstablishmentCause ::=         ENUMERATED {
                                  emergency, highPriorityAccess,
                                  mt-Access, mo-
Signalling,
                                  mo-Data, mo-VoiceCall,
                                  mo-VideoCall, mo-SMS,
mps-PriorityAccess,
mcs-PriorityAccess,
                                  spare6, spare5, spare4,
                                  spare3, spare2,
spare1}
-- TAG-RRCSETUPREQUEST-STOP
-- ASN1STOP
```

It is seen from simulation studies that PUSCH is one of the channels that has coverage limitations. If a UE has to send large UL data from poor coverage/being at a cell edge, there may be performance degradation and in worst cases connection drop/failure.

The UE may determine whether it is in poor coverage/cell edge based upon the measured RSRP value. The base station (NW) may also provide a certain RSRP threshold, and if UE measures a RSRP below that threshold value, the UE may consider it is in poor coverage/at a cell edge.

The UE application layer may provide the reason for establishment for RRC Setup. If the establishment cause is, for example, mo-Voice, it is expected that a large Session Initiation Protocol (SIP) message would be required to be transmitted or, for example, if it is mo-Data and the application layer wants to upload a large video file or photos. In those cases, the UE knows that it is going to transmit large UL data. This may be beneficial in addition to Rel-15 operation where the UE selects preamble group A or B, since the base station (network) can then signal additional RSRP thresholds or Msg3 or MsgA size limitations according to the needs of specific services.

In some embodiments the UE can use the 1 spare bit to indicate if it is in a poor coverage/at a cell edge and that it expects to dispatch/transmit large data, as shown below.

```
-- ASN1START
-- TAG-RRCSETUPREQUEST-START
RRCSetupRequest ::=            SEQUENCE {
   rrcSetupRequest                RRCSetupRequest-IEs
}
RRCSetupRequest-IEs ::=        SEQUENCE {
   ue-Identity                    InitialUE-Identity,
   establishmentCause             EstablishmentCause,
   ~~spare~~                      ~~BIT STRING (SIZE (1))~~
   poorCoverageLargeData-r17      BOOLEAN
}
InitialUE-Identity ::=         CHOICE {
   ng-5G-S-TMSI-Part1             BIT STRING (SIZE (39)),
   randomValue                    BIT STRING (SIZE (39))
}
EstablishmentCause ::=         ENUMERATED {
                                  emergency, highPriorityAccess,
                                  mt-Access, mo-
Signalling,
                                  mo-Data, mo-VoiceCall,
                                  mo-VideoCall, mo-SMS,
mps-PriorityAccess,
mcs-PriorityAccess,
                                  spare6, spare5, spare4,
                                  spare3, spare2,
spare1}
-- TAG-RRCSETUPREQUEST-STOP
-- ASN1STOP
```

In some embodiments, the flag (the (currently) spare bit) may be used either just for the poor coverage or just for the large data.

When a base station (NW) receives such an indication, it may handle this sort of UE in a preferential way. For example, the base station/NW may redirect the UE to another carrier/cell/beam with better coverage possibility; giving the UE scheduling priority; providing frequency selective scheduling; giving continuous small UL grants, selecting robust MCS; performing rapid power control; or enabling UL compression.

Figure 9:
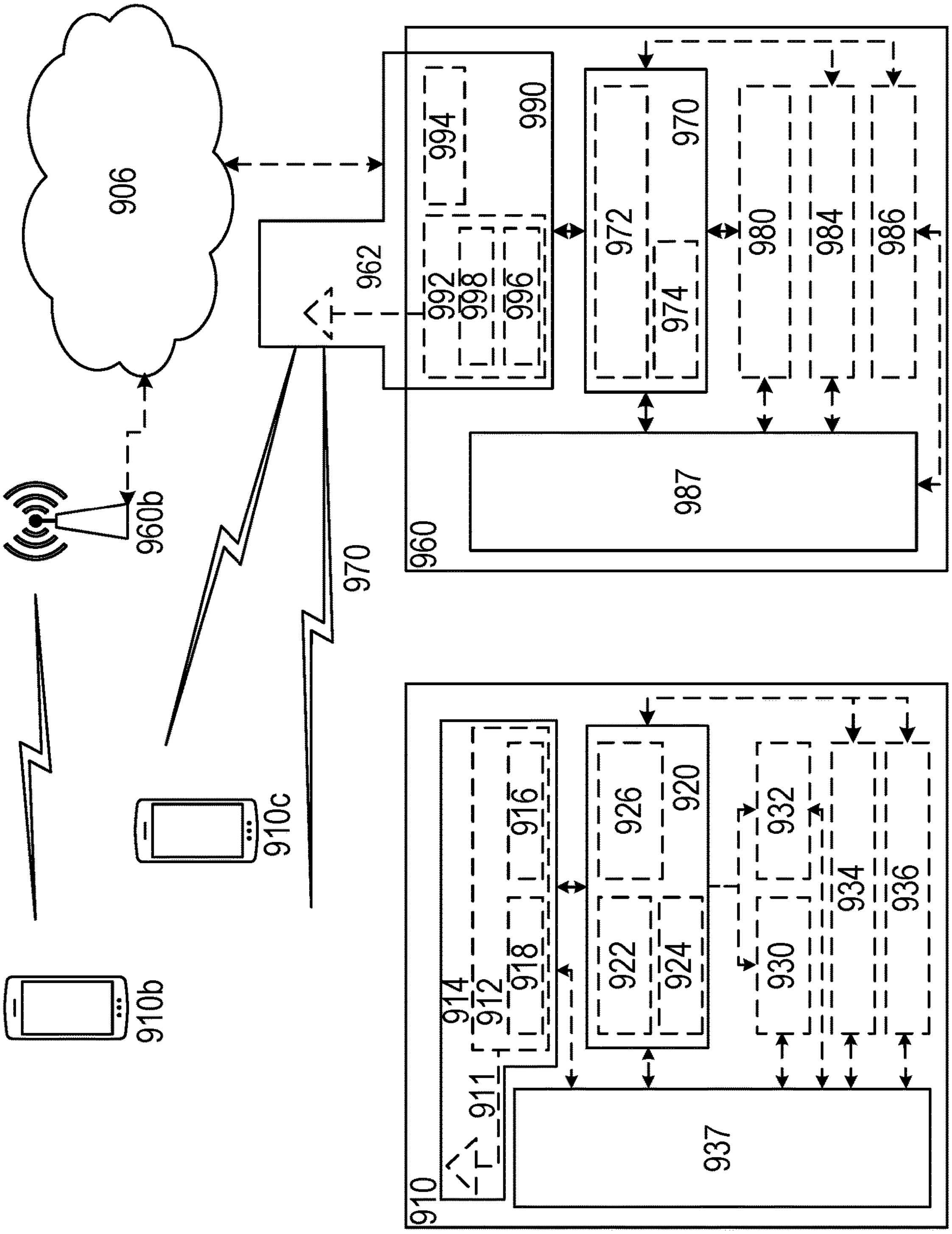
FIG. 9 is an illustration of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 906, network nodes 960 and 960*b*, and WDs 910, 910*b*, and 910*c*. In practice, a wireless network may further include any additional elements suitable to support communication between wireless devices or between a wireless device and another communication device, such as a landline telephone, a service provider, or any other network node or end device. Of the illustrated components, network node 960 and wireless device (WD) 910 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 906 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 960 and WD 910 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 960 includes processing circuitry 970, device readable medium 980, interface 990, auxiliary equipment 984, power source 986, power circuitry 987, and antenna 962. Although network node 960 illustrated in the example wireless network of FIG. 9 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 960 are depicted as single boxes located within a larger box, or nested within multiple boxes, in practice, a network node may comprise multiple different physical components that make up a single illustrated component (e.g., device readable medium 980 may comprise multiple separate hard drives as well as multiple RAM modules).

Similarly, network node 960 may be composed of multiple physically separate components (e.g., a NodeB component and a RNC component, or a BTS component and a BSC component, etc.), which may each have their own respective components. In certain scenarios in which network node 960 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 960 may be configured to support multiple radio access technologies (RATs). In such embodiments, some components may be duplicated (e.g., separate device readable medium 980 for the different RATs) and some components may be reused (e.g., the same antenna 962 may be shared by the RATs). Network node 960 may also include multiple sets of the various illustrated components for different wireless technologies integrated into network node 960, such as, for example, GSM, WCDMA, LTE, NR, WiFi, or Bluetooth wireless technologies. These wireless technologies may be integrated into the same or different chip or set of chips and other components within network node 960.

Processing circuitry 970 is configured to perform any determining, calculating, or similar operations (e.g., certain obtaining operations) described herein as being provided by a network node. These operations performed by processing circuitry 970 may include processing information obtained by processing circuitry 970 by, for example, converting the obtained information into other information, comparing the obtained information or converted information to information stored in the network node, and/or performing one or more operations based on the obtained information or converted information, and as a result of said processing making a determination.

Processing circuitry 970 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 960 components, such as device readable medium 980, network node 960 functionality. For example, processing circuitry 970 may execute instructions stored in device readable medium 980 or in memory within processing circuitry 970. Such functionality may include providing any of the various wireless features, functions, or benefits discussed herein. In some embodiments, processing circuitry 970 may include a system on a chip (SOC).

In some embodiments, processing circuitry 970 may include one or more of radio frequency (RF) transceiver circuitry 972 and baseband processing circuitry 974. In some embodiments, radio frequency (RF) transceiver circuitry 972 and baseband processing circuitry 974 may be on separate chips (or sets of chips), boards, or units, such as radio units and digital units. In alternative embodiments, part or all of RF transceiver circuitry 972 and baseband processing circuitry 974 may be on the same chip or set of chips, boards, or units In certain embodiments, some or all of the functionality described herein as being provided by a network node, base station, eNB or other such network device may be performed by processing circuitry 970 executing instructions stored on device readable medium 980 or memory within processing circuitry 970. In alternative embodiments, some or all of the functionality may be provided by processing circuitry 970 without executing instructions stored on a separate or discrete device readable medium, such as in a hard-wired manner. In any of those embodiments, whether executing instructions stored on a device readable storage medium or not, processing circuitry 970 can be configured to perform the described functionality. The benefits provided by such functionality are not limited to processing circuitry 970 alone or to other components of network node 960, but are enjoyed by network node 960 as a whole, and/or by end users and the wireless network generally.

Device readable medium 980 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 970. Device readable medium 980 may store any suitable instructions, data or information, including a computer program, software, an application including one or more of logic, rules, code, tables, etc. and/or other instructions capable of being executed by processing circuitry 970 and, utilized by network node 960. Device readable medium 980 may be used to store any calculations made by processing circuitry 970 and/or any data received via interface 990. In some embodiments, processing circuitry 970 and device readable medium 980 may be considered to be integrated.

Interface 990 is used in the wired or wireless communication of signalling and/or data between network node 960, network 906, and/or WDs 910. As illustrated, interface 990 comprises port(s)/terminal(s) 994 to send and receive data, for example to and from network 906 over a wired connection. Interface 990 also includes radio front end circuitry 992 that may be coupled to, or in certain embodiments a part of, antenna 962. Radio front end circuitry 992 comprises filters 998 and amplifiers 996. Radio front end circuitry 992 may be connected to antenna 962 and processing circuitry 970. Radio front end circuitry may be configured to condition signals communicated between antenna 962 and processing circuitry 970. Radio front end circuitry 992 may receive digital data that is to be sent out to other network nodes or WDs via a wireless connection. Radio front end circuitry 992 may convert the digital data into a radio signal having the appropriate channel and bandwidth parameters using a combination of filters 998 and/or amplifiers 996. The radio signal may then be transmitted via antenna 962. Similarly, when receiving data, antenna 962 may collect radio signals which are then converted into digital data by radio front end circuitry 992. The digital data may be passed to processing circuitry 970. In other embodiments, the interface may comprise different components and/or different combinations of components.

In certain alternative embodiments, network node 960 may not include separate radio front end circuitry 992, instead, processing circuitry 970 may comprise radio front end circuitry and may be connected to antenna 962 without separate radio front end circuitry 992. Similarly, in some embodiments, all or some of RF transceiver circuitry 972 may be considered a part of interface 990. In still other embodiments, interface 990 may include one or more ports or terminals 994, radio front end circuitry 992, and RF transceiver circuitry 972, as part of a radio unit (not shown), and interface 990 may communicate with baseband processing circuitry 974, which is part of a digital unit (not shown).

Antenna 962 may include one or more antennas, or antenna arrays, configured to send and/or receive wireless signals. Antenna 962 may be coupled to radio front end circuitry 992 and may be any type of antenna capable of transmitting and receiving data and/or signals wirelessly. In some embodiments, antenna 962 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 962 may be separate from network node 960 and may be connectable to network node 960 through an interface or port.

Antenna 962, interface 990, and/or processing circuitry 970 may be configured to perform any receiving operations and/or certain obtaining operations described herein as being performed by a network node. Any information, data and/or signals may be received from a wireless device, another network node and/or any other network equipment. Similarly, antenna 962, interface 990, and/or processing circuitry 970 may be configured to perform any transmitting operations described herein as being performed by a network node. Any information, data and/or signals may be transmitted to a wireless device, another network node and/or any other network equipment.

Power circuitry 987 may comprise, or be coupled to, power management circuitry and is configured to supply the components of network node 960 with power for performing the functionality described herein. Power circuitry 987 may receive power from power source 986. Power source 986 and/or power circuitry 987 may be configured to provide power to the various components of network node 960 in a form suitable for the respective components (e.g., at a voltage and current level needed for each respective component). Power source 986 may either be included in, or external to, power circuitry 987 and/or network node 960. For example, network node 960 may be connectable to an external power source (e.g., an electricity outlet) via an input circuitry or interface such as an electrical cable, whereby the external power source supplies power to power circuitry 987. As a further example, power source 986 may comprise a source of power in the form of a battery or battery pack which is connected to, or integrated in, power circuitry 987. The battery may provide backup power should the external power source fail. Other types of power sources, such as photovoltaic devices, may also be used.

Alternative embodiments of network node 960 may include additional components beyond those shown in FIG. 9 that may be responsible for providing certain aspects of the network node's functionality, including any of the functionality described herein and/or any functionality necessary to support the subject matter described herein. For example, network node 960 may include user interface equipment to allow input of information into network node 960 and to allow output of information from network node 960. This may allow a user to perform diagnostic, maintenance, repair, and other administrative functions for network node 960.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 910 includes antenna 911, interface 914, processing circuitry 920, device readable medium 930, user interface equipment 932, auxiliary equipment 934, power source 936 and power circuitry 937. WD 910 may include multiple sets of one or more of the illustrated components for different wireless technologies supported by WD 910, such as, for example, GSM, WCDMA, LTE, NR, WiFi, WiMAX, or Bluetooth wireless technologies, just to mention a few. These wireless technologies may be integrated into the same or different chips or set of chips as other components within WD 910.

Antenna 911 may include one or more antennas or antenna arrays, configured to send and/or receive wireless signals, and is connected to interface 914. In certain alternative embodiments, antenna 911 may be separate from WD 910 and be connectable to WD 910 through an interface or port. Antenna 911, interface 914, and/or processing circuitry 920 may be configured to perform any receiving or transmitting operations described herein as being performed by a WD. Any information, data and/or signals may be received from a network node and/or another WD. In some embodiments, radio front end circuitry and/or antenna 911 may be considered an interface.

As illustrated, interface 914 comprises radio front end circuitry 912 and antenna 911. Radio front end circuitry 912 comprise one or more filters 918 and amplifiers 916. Radio front end circuitry 912 is connected to antenna 911 and processing circuitry 920, and is configured to condition signals communicated between antenna 911 and processing circuitry 920. Radio front end circuitry 912 may be coupled to or a part of antenna 911. In some embodiments, WD 910 may not include separate radio front end circuitry 912; rather, processing circuitry 920 may comprise radio front end circuitry and may be connected to antenna 911. Similarly, in some embodiments, some or all of RF transceiver circuitry 922 may be considered a part of interface 914. Radio front end circuitry 912 may receive digital data that is to be sent out to other network nodes or WDs via a wireless connection. Radio front end circuitry 912 may convert the digital data into a radio signal having the appropriate channel and bandwidth parameters using a combination of filters 918 and/or amplifiers 916. The radio signal may then be transmitted via antenna 911. Similarly, when receiving data, antenna 911 may collect radio signals which are then converted into digital data by radio front end circuitry 912. The digital data may be passed to processing circuitry 920. In other embodiments, the interface may comprise different components and/or different combinations of components.

Processing circuitry 920 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 910 components, such as device readable medium 930, WD 910 functionality. Such functionality may include providing any of the various wireless features or benefits discussed herein. For example, processing circuitry 920 may execute instructions stored in device readable medium 930 or in memory within processing circuitry 920 to provide the functionality disclosed herein.

As illustrated, processing circuitry 920 includes one or more of RF transceiver circuitry 922, baseband processing circuitry 924, and application processing circuitry 926. In other embodiments, the processing circuitry may comprise different components and/or different combinations of components. In certain embodiments processing circuitry 920 of WD 910 may comprise a SOC. In some embodiments, RF transceiver circuitry 922, baseband processing circuitry 924, and application processing circuitry 926 may be on separate chips or sets of chips. In alternative embodiments, part or all of baseband processing circuitry 924 and application processing circuitry 926 may be combined into one chip or set of chips, and RF transceiver circuitry 922 may be on a separate chip or set of chips. In still alternative embodiments, part or all of RF transceiver circuitry 922 and baseband processing circuitry 924 may be on the same chip or set of chips, and application processing circuitry 926 may be on a separate chip or set of chips. In yet other alternative embodiments, part or all of RF transceiver circuitry 922, baseband processing circuitry 924, and application processing circuitry 926 may be combined in the same chip or set of chips. In some embodiments, RF transceiver circuitry 922 may be a part of interface 914. RF transceiver circuitry 922 may condition RF signals for processing circuitry 920.

In certain embodiments, some or all of the functionality described herein as being performed by a WD may be provided by processing circuitry 920 executing instructions stored on device readable medium 930, which in certain embodiments may be a computer-readable storage medium. In alternative embodiments, some or all of the functionality may be provided by processing circuitry 920 without executing instructions stored on a separate or discrete device readable storage medium, such as in a hard-wired manner. In any of those particular embodiments, whether executing instructions stored on a device readable storage medium or not, processing circuitry 920 can be configured to perform the described functionality. The benefits provided by such functionality are not limited to processing circuitry 920 alone or to other components of WD 910, but are enjoyed by WD 910 as a whole, and/or by end users and the wireless network generally.

Processing circuitry 920 may be configured to perform any determining, calculating, or similar operations (e.g., certain obtaining operations) described herein as being performed by a WD. These operations, as performed by processing circuitry 920, may include processing information obtained by processing circuitry 920 by, for example, converting the obtained information into other information, comparing the obtained information or converted information to information stored by WD 910, and/or performing one or more operations based on the obtained information or converted information, and as a result of said processing making a determination.

Device readable medium 930 may be operable to store a computer program, software, an application including one or more of logic, rules, code, tables, etc. and/or other instructions capable of being executed by processing circuitry 920. Device readable medium 930 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 920. In some embodiments, processing circuitry 920 and device readable medium 930 may be considered to be integrated.

User interface equipment 932 may provide components that allow for a human user to interact with WD 910. Such interaction may be of many forms, such as visual, audial, tactile, etc. User interface equipment 932 may be operable to produce output to the user and to allow the user to provide input to WD 910. The type of interaction may vary depending on the type of user interface equipment 932 installed in WD 910. For example, if WD 910 is a smart phone, the interaction may be via a touch screen; if WD 910 is a smart meter, the interaction may be through a screen that provides usage (e.g., the number of gallons used) or a speaker that provides an audible alert (e.g., if smoke is detected). User interface equipment 932 may include input interfaces, devices and circuits, and output interfaces, devices and circuits. User interface equipment 932 is configured to allow input of information into WD 910, and is connected to processing circuitry 920 to allow processing circuitry 920 to process the input information. User interface equipment 932 may include, for example, a microphone, a proximity or other sensor, keys/buttons, a touch display, one or more cameras, a USB port, or other input circuitry. User interface equipment 932 is also configured to allow output of information from WD 910, and to allow processing circuitry 920 to output information from WD 910. User interface equipment 932 may include, for example, a speaker, a display, vibrating circuitry, a USB port, a headphone interface, or other output circuitry. Using one or more input and output interfaces, devices, and circuits, of user interface equipment 932, WD 910 may communicate with end users and/or the wireless network, and allow them to benefit from the functionality described herein.

Auxiliary equipment 934 is operable to provide more specific functionality which may not be generally performed by WDs. This may comprise specialized sensors for doing measurements for various purposes, interfaces for additional types of communication such as wired communications etc. The inclusion and type of components of auxiliary equipment 934 may vary depending on the embodiment and/or scenario.

Power source 936 may, in some embodiments, be in the form of a battery or battery pack. Other types of power sources, such as an external power source (e.g., an electricity outlet), photovoltaic devices or power cells, may also be used. WD 910 may further comprise power circuitry 937 for delivering power from power source 936 to the various parts of WD 910 which need power from power source 936 to carry out any functionality described or indicated herein. Power circuitry 937 may in certain embodiments comprise power management circuitry. Power circuitry 937 may additionally or alternatively be operable to receive power from an external power source; in which case WD 910 may be connectable to the external power source (such as an electricity outlet) via input circuitry or an interface such as an electrical power cable. Power circuitry 937 may also in certain embodiments be operable to deliver power from an external power source to power source 936. This may be, for example, for the charging of power source 936. Power circuitry 937 may perform any formatting, converting, or other modification to the power from power source 936 to make the power suitable for the respective components of WD 910 to which power is supplied.

Figure 10:
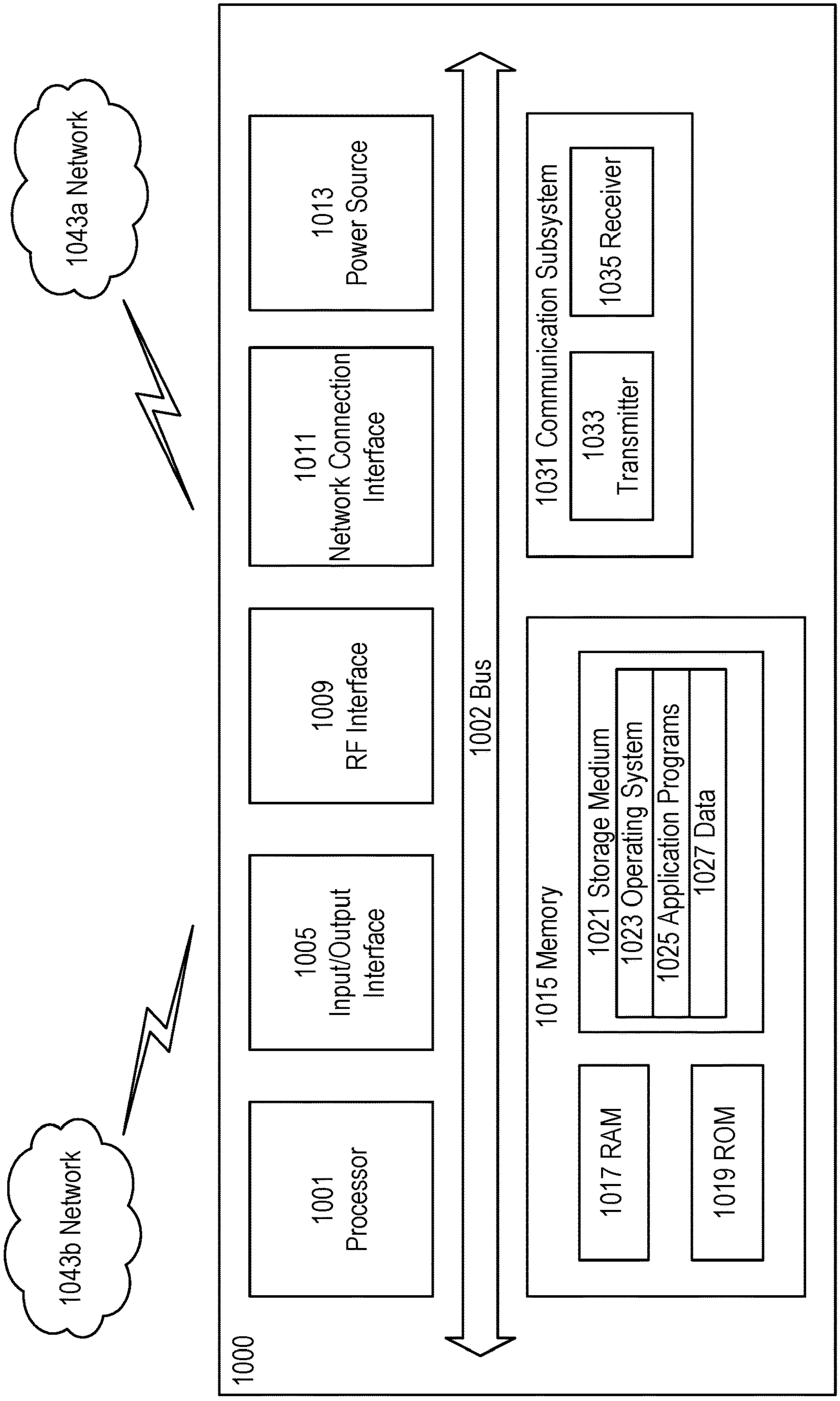
FIG. 10 is an illustration of a User Equipment in accordance with some embodiments.

FIG. 10 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1000 may be any UE identified by the 3$^{rd}$ Generation Partnership Project (3GPP), including a NB-IoT UE, a machine type communication (MTC) UE, and/or an enhanced MTC (eMTC) UE. UE 1000, as illustrated in FIG.

10, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 10 is a UE, the components discussed herein are equally applicable to a WD, and vice-versa.

In FIG. 10, UE 1000 includes processing circuitry 1001 that is operatively coupled to input/output interface 1005, radio frequency (RF) interface 1009, network connection interface 1011, memory 1015 including random access memory (RAM) 1017, read-only memory (ROM) 1019, and storage medium 1021 or the like, communication subsystem 1031, power source 1033, and/or any other component, or any combination thereof. Storage medium 1021 includes operating system 1023, application program 1025, and data 1027. In other embodiments, storage medium 1021 may include other similar types of information. Certain UEs may utilize all of the components shown in FIG. 10, or only a subset of the components. The level of integration between the components may vary from one UE to another UE. Further, certain UEs may contain multiple instances of a component, such as multiple processors, memories, transceivers, transmitters, receivers, etc.

In FIG. 10, processing circuitry 1001 may be configured to process computer instructions and data. Processing circuitry 1001 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1001 may include two central processing units (CPUs). Data may be information in a form suitable for use by a computer.

In the depicted embodiment, input/output interface 1005 may be configured to provide a communication interface to an input device, output device, or input and output device. UE 1000 may be configured to use an output device via input/output interface 1005. An output device may use the same type of interface port as an input device. For example, a USB port may be used to provide input to and output from UE 1000. The output device may be a speaker, a sound card, a video card, a display, a monitor, a printer, an actuator, an emitter, a smartcard, another output device, or any combination thereof. UE 1000 may be configured to use an input device via input/output interface 1005 to allow a user to capture information into UE 1000. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 10, RF interface 1009 may be configured to provide a communication interface to RF components such as a transmitter, a receiver, and an antenna. Network connection interface 1011 may be configured to provide a communication interface to network 1043a. Network 1043a may encompass wired and/or wireless networks such as a local-area network (LAN), a wide-area network (WAN), a computer network, a wireless network, a telecommunications network, another like network or any combination thereof. For example, network 1043a may comprise a Wi-Fi network. Network connection interface 1011 may be configured to include a receiver and a transmitter interface used to communicate with one or more other devices over a communication network according to one or more communication protocols, such as Ethernet, TCP/IP, SONET, ATM, or the like. Network connection interface 1011 may implement receiver and transmitter functionality appropriate to the communication network links (e.g., optical, electrical, and the like). The transmitter and receiver functions may share circuit components, software or firmware, or alternatively may be implemented separately.

RAM 1017 may be configured to interface via bus 1002 to processing circuitry 1001 to provide storage or caching of data or computer instructions during the execution of software programs such as the operating system, application programs, and device drivers. ROM 1019 may be configured to provide computer instructions or data to processing circuitry 1001. For example, ROM 1019 may be configured to store invariant low-level system code or data for basic system functions such as basic input and output (I/O), startup, or reception of keystrokes from a keyboard that are stored in a non-volatile memory. Storage medium 1021 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1021 may be configured to include operating system 1023, application program 1025 such as a web browser application, a widget or gadget engine or another application, and data file 1027. Storage medium 1021 may store, for use by UE 1000, any of a variety of various operating systems or combinations of operating systems.

Storage medium 1021 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1021 may allow UE 1000 to access computer-executable instructions, application programs or the like, stored on transitory or non-transitory memory media, to off-load data, or to upload data. An article of manufacture, such as one utilizing a communication system may be tangibly embodied in storage medium 1021, which may comprise a device readable medium.

In FIG. 10, processing circuitry 1001 may be configured to communicate with network 1043b using communication subsystem 1031. Network 1043a and network 1043b may be the same network or networks or different network or networks. Communication subsystem 1031 may be configured to include one or more transceivers used to communicate with network 1043*b*. For example, communication subsystem 1031 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1033 and/or receiver 1035 to implement transmitter or receiver functionality, respectively, appropriate to the RAN links (e.g., frequency allocations and the like). Further, transmitter 1033 and receiver 1035 of each transceiver may share circuit components, software or firmware, or alternatively may be implemented separately.

In the illustrated embodiment, the communication functions of communication subsystem 1031 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1031 may include cellular communication, Wi-Fi communication, Bluetooth communication, and GPS communication. Network 1043*b* may encompass wired and/or wireless networks such as a local-area network (LAN), a wide-area network (WAN), a computer network, a wireless network, a telecommunications network, another like network or any combination thereof. For example, network 1043*b* may be a cellular network, a Wi-Fi network, and/or a near-field network. Power source 1013 may be configured to provide alternating current (AC) or direct current (DC) power to components of UE 1000.

The features, benefits and/or functions described herein may be implemented in one of the components of UE 1000 or partitioned across multiple components of UE 1000. Further, the features, benefits, and/or functions described herein may be implemented in any combination of hardware, software or firmware. In one example, communication subsystem 1031 may be configured to include any of the components described herein. Further, processing circuitry 1001 may be configured to communicate with any of such components over bus 1002. In another example, any of such components may be represented by program instructions stored in memory that when executed by processing circuitry 1001 perform the corresponding functions described herein. In another example, the functionality of any of such components may be partitioned between processing circuitry 1001 and communication subsystem 1031. In another example, the non-computationally intensive functions of any of such components may be implemented in software or firmware and the computationally intensive functions may be implemented in hardware.

Figure 11:
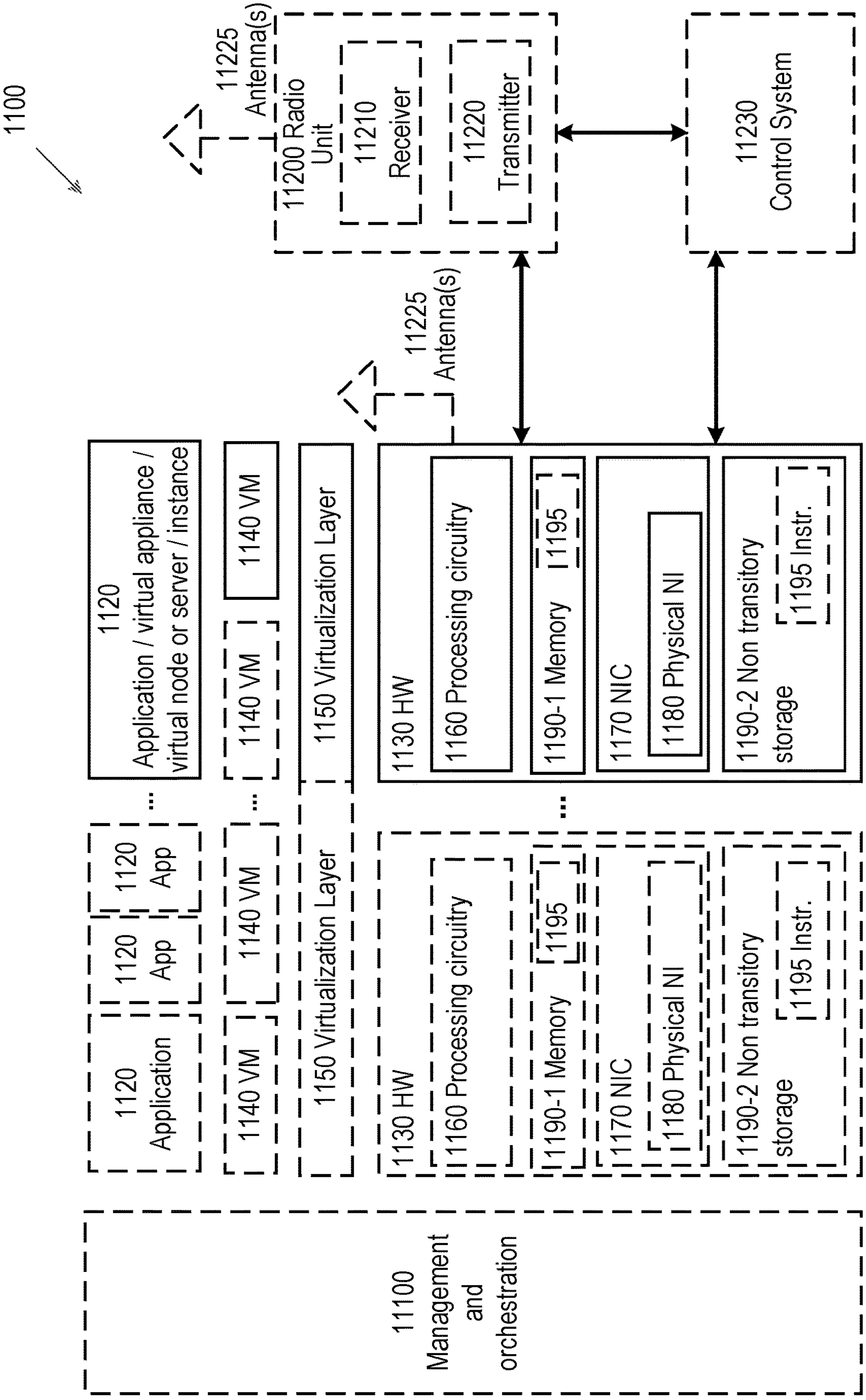
FIG. 11 is an illustration of a Virtualization environment in accordance with some embodiments.

FIG. 11 is a schematic block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1100 hosted by one or more of hardware nodes 1130. Further, in embodiments in which the virtual node is not a radio access node or does not require radio connectivity (e.g., a core network node), then the network node may be entirely virtualized.

The functions may be implemented by one or more applications 1120 (which may alternatively be called software instances, virtual appliances, network functions, virtual nodes, virtual network functions, etc.) operative to implement some of the features, functions, and/or benefits of some of the embodiments disclosed herein. Applications 1120 are run in virtualization environment 1100 which provides hardware 1130 comprising processing circuitry 1160 and memory 1190. Memory 1190 contains instructions 1195 executable by processing circuitry 1160 whereby application 1120 is operative to provide one or more of the features, benefits, and/or functions disclosed herein.

Virtualization environment 1100, comprises general-purpose or special-purpose network hardware devices 1130 comprising a set of one or more processors or processing circuitry 1160, which may be commercial off-the-shelf (COTS) processors, dedicated Application Specific Integrated Circuits (ASICs), or any other type of processing circuitry including digital or analog hardware components or special purpose processors. Each hardware device may comprise memory 1190-1 which may be non-persistent memory for temporarily storing instructions 1195 or software executed by processing circuitry 1160. Each hardware device may comprise one or more network interface controllers (NICs) 1170, also known as network interface cards, which include physical network interface 1180. Each hardware device may also include non-transitory, persistent, machine-readable storage media 1190-2 having stored therein software 1195 and/or instructions executable by processing circuitry 1160. Software 1195 may include any type of software including software for instantiating one or more virtualization layers 1150 (also referred to as hypervisors), software to execute virtual machines 1140 as well as software allowing it to execute functions, features and/or benefits described in relation with some embodiments described herein.

Virtual machines 1140, comprise virtual processing, virtual memory, virtual networking or interface and virtual storage, and may be run by a corresponding virtualization layer 1150 or hypervisor. Different embodiments of the instance of virtual appliance 1120 may be implemented on one or more of virtual machines 1140, and the implementations may be made in different ways.

During operation, processing circuitry 1160 executes software 1195 to instantiate the hypervisor or virtualization layer 1150, which may sometimes be referred to as a virtual machine monitor (VMM). Virtualization layer 1150 may present a virtual operating platform that appears like networking hardware to virtual machine 1140.

As shown in FIG. 11, hardware 1130 may be a standalone network node with generic or specific components. Hardware 1130 may comprise antenna 11225 and may implement some functions via virtualization. Alternatively, hardware 1130 may be part of a larger cluster of hardware (e.g. such as in a data center or customer premise equipment (CPE)) where many hardware nodes work together and are managed via management and orchestration (MANO) 11100, which, among others, oversees lifecycle management of applications 1120.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1140 may be a software implementation of a physical machine that runs programs as if they were executing on a physical, non-virtualized machine. Each of virtual machines 1140, and that part of hardware 1130 that executes that virtual machine, be it hardware dedicated to that virtual machine and/or hardware shared by that virtual machine with others of the virtual machines 1140, forms a separate virtual network elements (VNE).

Still in the context of NFV, Virtual Network Function (VNF) is responsible for handling specific network functions that run in one or more virtual machines 1140 on top of hardware networking infrastructure 1130 and corresponds to application 1120 in FIG. 11.

In some embodiments, one or more radio units 11200 that each include one or more transmitters 11220 and one or more receivers 11210 may be coupled to one or more antennas 11225. Radio units 11200 may communicate directly with hardware nodes 1130 via one or more appropriate network interfaces and may be used in combination with the virtual components to provide a virtual node with radio capabilities, such as a radio access node or a base station.

In some embodiments, some signalling can be effected with the use of control system 11230 which may alternatively be used for communication between the hardware nodes 1130 and radio units 11200.

Figure 12:
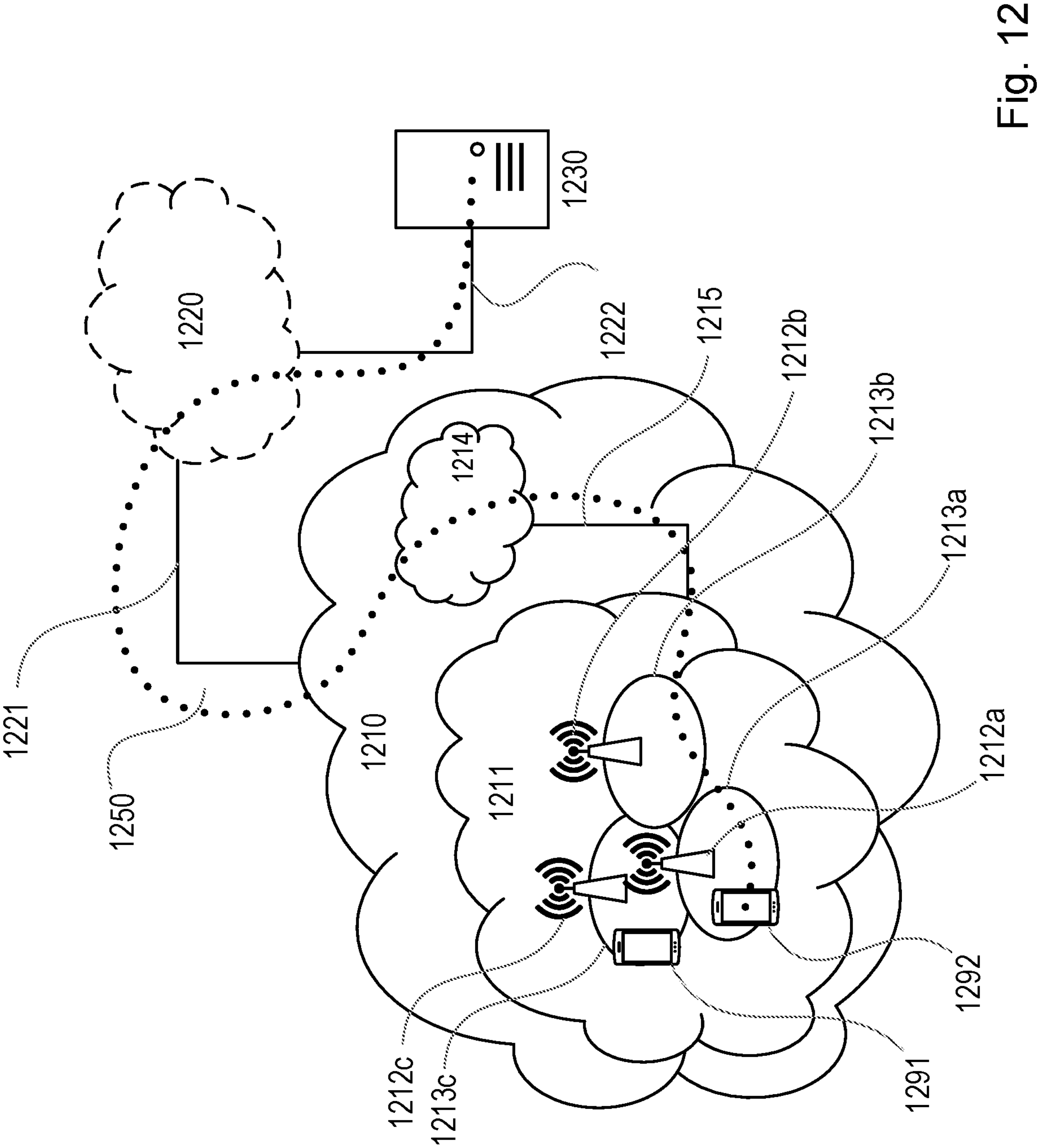
FIG. 12 is an illustration of a telecommunication network connected via an intermediate network to a host computer in accordance with some embodiments.

With reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212*a*, 1212*b*, 1212*c*, such as NBs, eNBs, gNBs or other types of wireless access points, each defining a corresponding coverage area 1213*a*, 1213*b*, 1213*c*. Each base station 1212*a*, 1212*b*, 1212*c* is connectable to core network 1214 over a wired or wireless connection 1215. A first UE 1291 located in coverage area 1213*c* is configured to wirelessly connect to, or be paged by, the corresponding base station 1212*c*. A second UE 1292 in coverage area 1213*a* is wirelessly connectable to the corresponding base station 1212*a*. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signalling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 13. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

Figure 13:
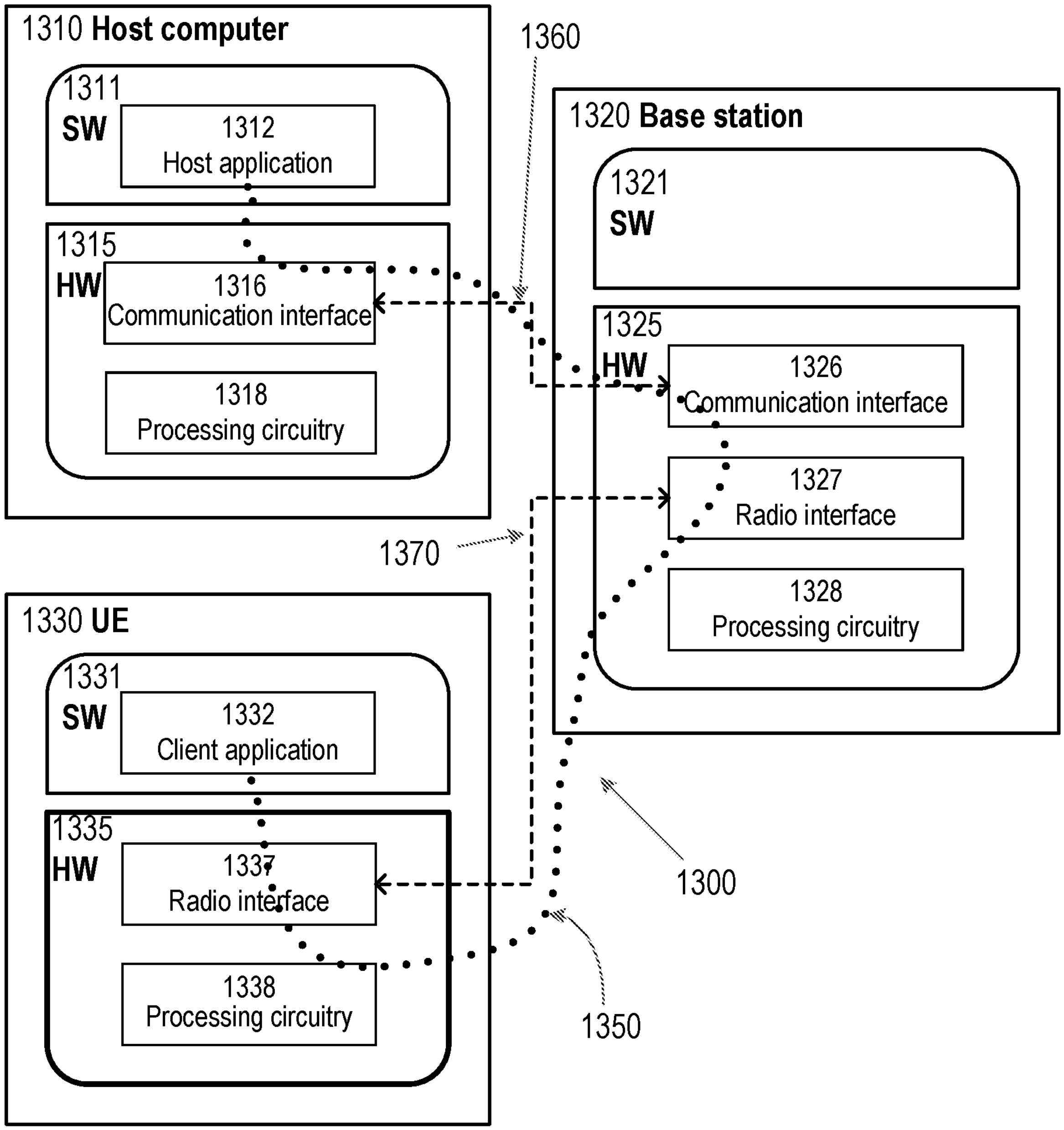
FIG. 13 is an illustration of a host computer communicating via a base station with a user equipment over a partially wireless connection in accordance with some embodiments.

It is noted that host computer 1310, base station 1320 and UE 1330 illustrated in FIG. 13 may be similar or identical to host computer QQ430, one of base stations QQ412a, QQ412b, QQ412c and one of UEs QQ491, QQ492 of Figure QQ4, respectively. This is to say, the inner workings of these entities may be as shown in FIG. 13 and independently, the surrounding network topology may be that of Figure QQ4.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may enable efficient data transmission with high spectral efficiency, and beam adjustment as early as msg4 and msgB in the RACH procedure. These embodiments may enable the network to determine a msgB TB scaling factor (if appropriate), a msg4 PDCCH AL (if appropriate), a msg4 MCS (if appropriate) based on an early CSI report. These embodiments thereby provide benefits such as efficient connection establishment between a UE and the network, and may provide a reduced user waiting time when a connection is to be established.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signalling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 14:
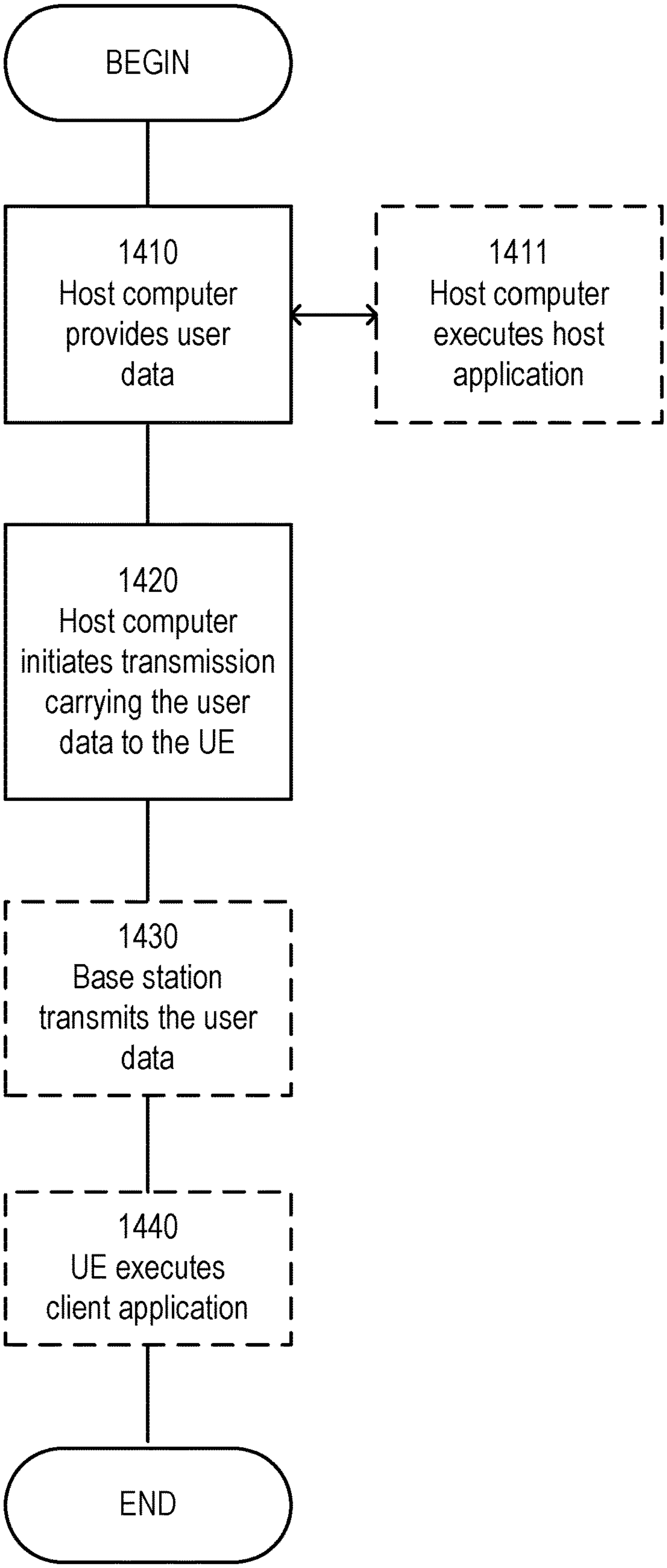
FIG. 14 is an illustration of methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
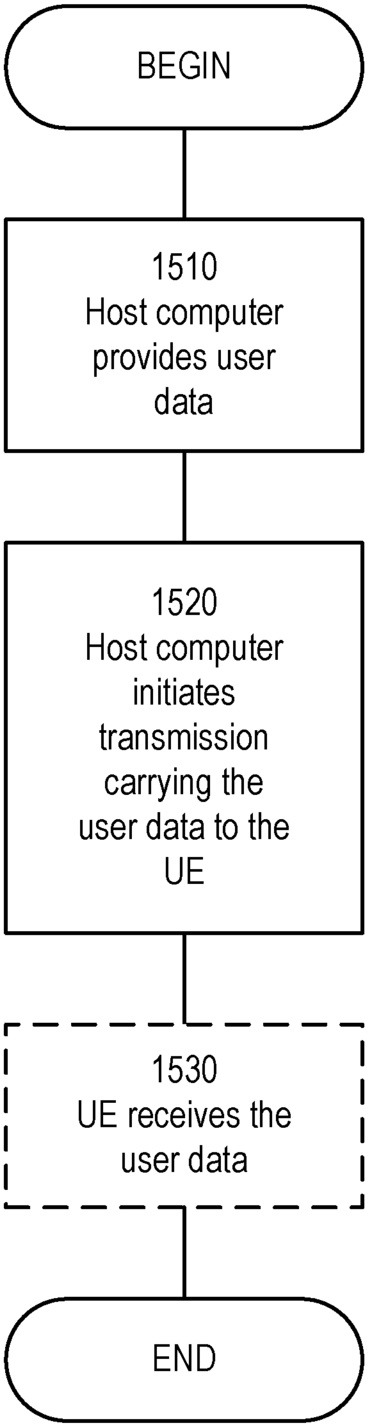
FIG. 15 is an illustration of methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
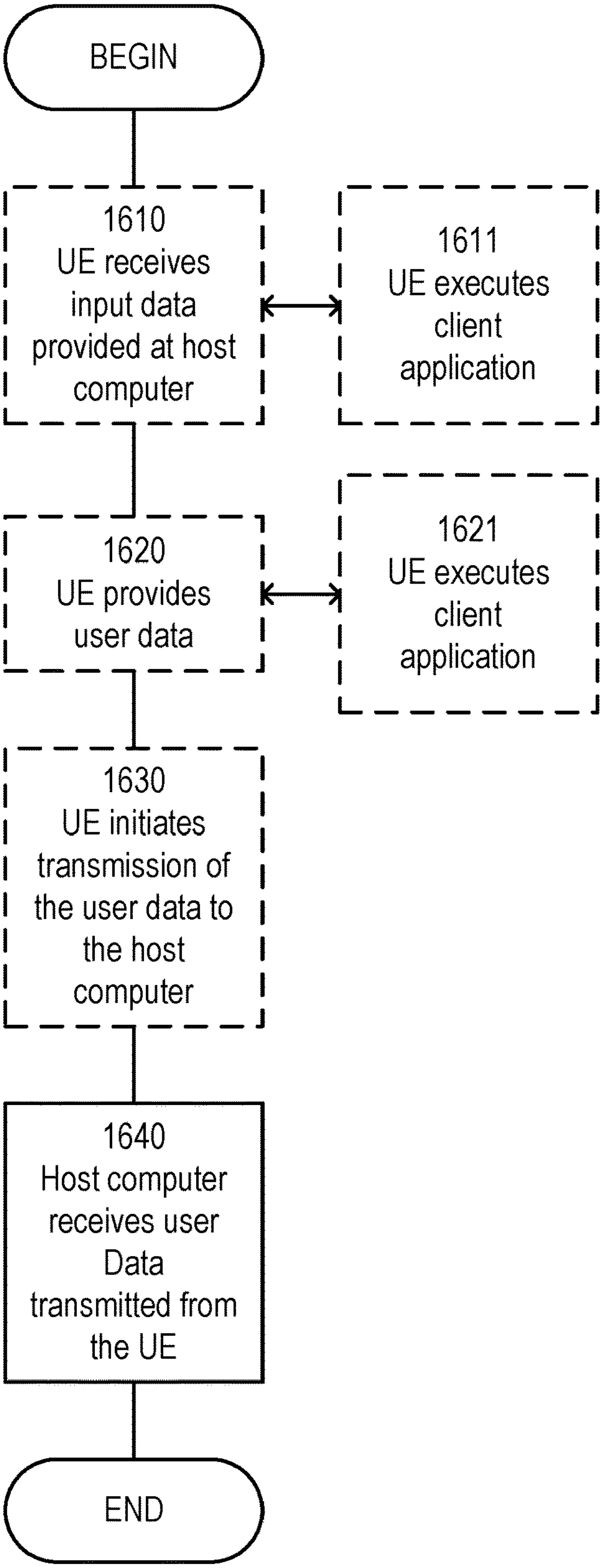
FIG. 16 is an illustration of methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

Figure 17:
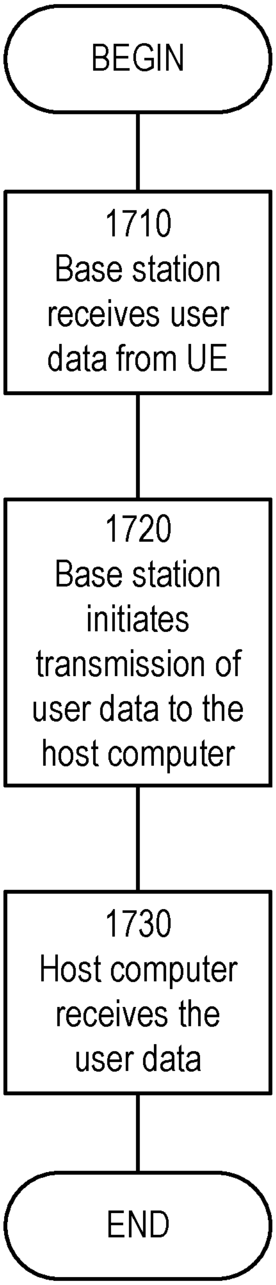
FIG. 17 is an illustration of methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Although not illustrated in the figures, a wireless device or a base station operating according to the techniques described herein can be implemented in the form of an apparatus that may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause the wireless device or base station to perform functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EMBODIMENTS

Group A Embodiments

1. A method performed by a wireless device in a random access, RA, procedure, the method comprising:
   performing measurements of one or more reference signals transmitted by a base station;
   sending a first message [e.g. Msg3 PUSCH or MsgA PUSCH] to the base station in a Physical Uplink Shared Channel, PUSCH, wherein the first message comprises a Channel State Information, CSI, report comprising information based on the measurements of the one or more reference signals.
2. The method of embodiment 1, wherein the information in the CSI report comprises a Synchronization Signal/Physical Broadcast Channel Block Resource Indicator, SSBRI, and/or a Channel State Information Reference Signal Resource Indicator, CRI.
3. The method of embodiment 2, wherein a bit length of the SSBRI is related to a number of reference signals transmitted by the base station.
4. The method of any of embodiments 1-3, wherein the step of performing measurements comprises performing measurements of one or more parameters for the one or more reference signals, wherein the one or more parameters comprise any one or more of: L1-RSRP, L1-RSRQ, L1-SINR and channel quality information, CQI.
5. The method of embodiment 4, when dependent on embodiment 2, wherein a number of L1-RSRP measurements in the CSI report is less than a number of SSBRI and/or CRI in the CSI report.
6. The method of embodiment 4, when dependent on embodiment 2, wherein, if a number of reported signals equals a number of reference signals, or if all reference signals in a RA occasion associated with a preamble are to be reported, the information in the CSI report comprises RSRPs of the reference signals in increasing reference signal index.
7. The method of any of embodiments 1-6, wherein the CSI report comprises information for each of a best one or more reference signals, wherein the best one or more reference signals are the reference signals having the best measurements.
8. The method of embodiment 7, wherein the number of reference signals for which the best measurements are to be included in the CSI report is (i) predetermined; (ii) configured in radio resource control, RRC, signalling; (iii) configured in downlink control information, DCI;

(iv) configured in a RA response message; or (v) associated to a frequency band.

9. The method of any of embodiments 1-8, wherein the step of performing measurements comprises measuring all reference signals in a RA occasion associated with a preamble, or measuring a single reference signal associated with a preamble.

10. The method of any of embodiments 1-9, wherein the method further comprises:
determining a list of information to be included in a CSI report from a System Information Block, SIB, broadcast.

11. The method of any of embodiments 1-10, wherein the RA procedure is a 4-step RA procedure.

12. The method of any of embodiments 1-11, wherein the method performed by the wireless device in the RA procedure further comprises, prior to sending the first message:
sending a second message [e.g. Msg1 PRACH] to the base station, wherein the second message comprises a first preamble selected from a set of preambles.

13. The method of embodiment 11 or 12, wherein the method performed by the wireless device in the RA procedure further comprises, prior to sending the first message:
receiving a RA response message [e.g. Msg2] from the base station, wherein the RA response message provides an uplink grant for sending the first message.

14. The method of embodiment 13, wherein the RA response message further comprises (i) an indication of a number of reference signals that the wireless device is to provide information for in the CSI report; and/or (ii) an indication of one or more parameters to be measured by the wireless device and included in the CSI report.

15. The method of embodiment 13 or 14, wherein the RA response message further comprises an indication that delaying the sending of the first message is permitted, so as to enable the wireless device to perform the measurements of the one or more reference signals.

16. The method of any of embodiments 13 or 14, wherein the method further comprises:
receiving an indication that delaying the sending of the first message after receiving the RA response message is permitted, so as to enable the wireless device to perform the measurements of the one or more reference signals, wherein the indication is received in a System Information Block, SIB, broadcast.

17. The method of any of embodiments 13-16, wherein the method performed by the wireless device in the RA procedure further comprises:
receiving a third message [e.g. Msg4 PDCCH] from the base station in a Physical Downlink Control Channel, PDCCH, wherein the third message indicates a beam to use for receiving information in a Physical Downlink Shared Channel, PDSCH, from the base station.

18. The method of any of embodiments 1-10, wherein the RA procedure is a 2-step RA procedure.

19. The method of any of embodiments 1-10 or 18, wherein the wireless device further sends a first preamble selected from a set of preambles to the base station.

20. The method of embodiment 18 or 19, wherein the method performed by the wireless device in the RA procedure further comprises:
receiving a RA response message [e.g. MsgB PDCCH] from the base station, wherein the RA response message is a response to the first message.

21. The method of embodiment 20, wherein the RA response message is received in a Physical Downlink Control Channel, PDCCH, and the RA response message indicates a beam to use for receiving information in a Physical Downlink Shared Channel, PDSCH, from the base station.

22. The method of any of embodiments 18-21, wherein the first message further comprises (i) an indication of a number of reference signals that the information in the CSI report relates to; and/or (ii) an indication of one or more parameters for the one or more reference signals to be measured by the wireless device.

23. The method of any of embodiments 12-17 when dependent on embodiment 12, or any of embodiments 19-22 when dependent on embodiment 19, wherein the first preamble is sent to the base station during a first RA occasion in a set of RA occasions, and wherein the first preamble and the first RA occasion identify a reference signal that the CSI report relates to.

24. The method of any of embodiments 1-23, wherein the method further comprises:
determining from the measurements of the one or more reference signals whether the wireless device has poor coverage from the base station and/or is near a cell edge; and
sending a Radio Resource Connection, RRC, request to the base station, wherein the RRC request comprises an indicator that indicates whether the wireless device has a large amount of data to transmit to the base station and (i) the wireless device has poor coverage from the base station and/or (ii) is near a cell edge.

25. The method of any of embodiments 1-23, wherein the method further comprises:
determining from the measurements of the one or more reference signals whether the wireless device has poor coverage from the base station and/or is near a cell edge; and
sending a Radio Resource Connection, RRC, request to the base station, wherein the RRC request comprises an indicator that indicates whether the wireless device has poor coverage from the base station and/or is near a cell edge.

26. The method of any of the previous embodiments, further comprising:
providing user data; and
forwarding the user data to a host computer via the transmission to the base station.

Group B Embodiments

27. A method performed by a base station in a random access, RA, procedure by a wireless device, the method comprising:
receiving a first message [e.g. Msg3 PUSCH or MsgA PUSCH] from the wireless device in a Physical Uplink Shared Channel, PUSCH, wherein the first message comprises a Channel State Information, CSI, report comprising information for one or more reference signals transmitted by the base station.

28. The method of embodiment 17, wherein the information in the CSI report comprises a Synchronization Signal/Physical Broadcast Channel Block Resource Indicator, SSBRI, and/or a Channel State Information Reference Signal Resource Indicator, CRI.

29. The method of embodiment 28, wherein a bit length of the SSBRI is related to a number of reference signals transmitted by the base station.

30. The method of any of embodiments 27-29, wherein the information in the CSI report comprises measurements of one or more parameters for the one or more reference signals, wherein the one or more parameters comprise any one or more of: L1-RSRP, L1-RSRQ, L1-SINR and channel quality information, CQI.

31. The method of embodiment 30, when dependent on embodiment 28, wherein a number of L1-RSRP measurements in the CSI report is less than a number of SSBRI and/or CRI in the CSI report.

32. The method of embodiment 30, when dependent on embodiment 2, wherein, if a number of reported signals equals a number of reference signals, or if all reference signals in a RA occasion associated with a preamble are to be reported, the information in the CSI report comprises RSRPs of the reference signals in increasing reference signal index.

33. The method of any of embodiments 27-32, wherein the CSI report comprises information for each of a best one or more reference signals, wherein the best one or more reference signals are the reference signals having the best measurements at the wireless device.

34. The method of embodiment 33, wherein the number of reference signals for which the best measurements are included in the CSI report is (i) predetermined; (ii) configured in radio resource control, RRC, signalling; (iii) configured in downlink control information, DCI; (iv) configured in a RA response message; or (v) associated to a frequency band.

35. The method of any of embodiments 27-34, wherein the method further comprises:
broadcasting a System Information Block, SIB, wherein the SIB comprises a list of information for the wireless device to include in a CSI report.

36. The method of any of embodiments 27-35, wherein the RA procedure is a 4-step RA procedure.

37. The method of any of embodiments 27-36, wherein the method performed by the base station in the RA procedure further comprises, prior to receiving the first message:
receiving a second message [e.g. Msg1 PRACH] from the wireless device, wherein the second message comprises a first preamble selected from a set of preambles.

38. The method of embodiment 36 or 37, wherein the method performed by the base station in the RA procedure further comprises, prior to receiving the first message:
sending a RA response message [e.g. Msg2] to the wireless device, wherein the RA response message provides an uplink grant to the wireless device for sending the first message.

39. The method of embodiment 38, wherein the RA response message further comprises (i) an indication of a number of reference signals that the wireless device is to provide information for in the CSI report;
and/or (ii) an indication of one or more parameters to be measured by the wireless device and included in the CSI report.

40. The method of embodiment 38 or 39, wherein the RA response message further comprises an indication that delaying the sending of the first message is permitted, so as to enable the wireless device to perform measurements of the one or more reference signals.

41. The method of any of embodiments 38 or 39, wherein the method further comprises:
sending an indication to the wireless device that delaying the sending of the first message after receiving the RA response message is permitted, so as to enable the wireless device to perform the measurements of the one or more reference signals, wherein the indication is sent in a System Information Block, SIB, broadcast.

42. The method of any of embodiments 36-41, further comprising:
evaluating the information in the CSI report for one or more reference signals to determine one or more of: (i) uplink and/or downlink beams to use for subsequent transmissions between the base station and the wireless device; (ii) a modulation and coding scheme, MCS; (iii) a transport block, TB, scaling factor; and (iv) a Physical Downlink Control Channel, PDCCH, aggregation level; and
sending a third message [e.g. Msg4 PDCCH] to the wireless device in a PDCCH, wherein the third message indicates a beam that the wireless device is to use for receiving information in a Physical Downlink Shared Channel, PDSCH, from the base station.

43. The method of any of embodiments 27-35, wherein the RA procedure is a 2-step RA procedure.

44. The method of any of embodiments 27-35 or 43, wherein the method further comprises receiving, from the wireless device, a first preamble selected from a set of preambles.

45. The method of embodiment 43 or 44, wherein the method performed by the base station in the RA procedure further comprises:
sending a RA response message [e.g. MsgB PDCCH] to the wireless device, wherein the RA response message is a response to the first message.

46. The method of embodiment 45, further comprising:
evaluating the information in the CSI report for one or more reference signals to determine one or more of: (i) uplink and/or downlink beams to use for subsequent transmissions between the base station and the wireless device; (ii) a modulation and coding scheme, MCS; (iii) a transport block, TB, scaling factor; and (iv) a Physical Downlink Control Channel, PDCCH, aggregation level; and
wherein the RA response message is sent in a PDCCH, wherein the RA response message indicates a beam that the wireless device is to use for receiving information in a Physical Downlink Shared Channel, PDSCH, from the base station.

47. The method of any of embodiments 43-46, wherein the first message further comprises (i) an indication of a number of reference signals that the information in the CSI report relates to; and/or (ii) an indication of one or more parameters for the one or more reference signals to be measured by the wireless device.

48. The method of any of embodiments 36-42 when dependent on embodiment 37, or any of embodiments 43-47 when dependent on embodiment 44, wherein the first preamble is received during a first RA occasion in a set of RA occasions, and wherein the method performed by the base station in the RA procedure further comprises:

identifying the one or more reference signals that the received first message relates to based on the first preamble and/or the first RA occasion the first message was received in.

49. The method of any of embodiments 27-48, wherein the method further comprises:
receiving a Radio Resource Connection, RRC, request from the wireless device, wherein the RRC request comprises an indicator that indicates whether the wireless device has a large amount of data to transmit to the base station and (i) the wireless device has poor coverage from the base station and/or (ii) is near a cell edge.

50. The method of any of embodiments 27-48, wherein the method further comprises:
receiving a Radio Resource Connection, RRC, request from the wireless device, wherein the RRC request comprises an indicator that indicates whether the wireless device has poor coverage from the base station and/or is near a cell edge.

51. The method of embodiments 49 or 50, wherein the method further comprises:
determining whether to perform an action in respect of the wireless device based on the received indicator, wherein the action comprises any of: (i) redirecting the wireless device to another carrier/cell/beam; (ii) giving the wireless device scheduling priority; (iii) providing frequency selective scheduling for the wireless device; (iv) giving the wireless device continuous small UL grants; (v) selecting a modulation and coding scheme, MCS, for the wireless device; (vi) performing rapid power control; and (vii) enabling uplink compression.

52. The method of any of embodiments 27-51, further comprising:
obtaining user data; and
forwarding the user data to a host computer or a wireless device.

Group C Embodiments

53. A wireless device, the wireless device comprising:
processing circuitry configured to perform any of the steps of any of the Group A embodiments; and
power supply circuitry configured to supply power to the wireless device.

54. A base station, the base station comprising:
processing circuitry configured to perform any of the steps of any of the Group B embodiments;
power supply circuitry configured to supply power to the base station.

55. A user equipment (UE), the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

56. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

57. The communication system of the previous embodiment further including the base station.

58. The communication system of the previous 2 embodiments, further including the UE, wherein the UE is configured to communicate with the base station.

59. The communication system of the previous 3 embodiments, wherein:
the processing circuitry of the host computer is configured to execute a host application, thereby providing the user data; and
the UE comprises processing circuitry configured to execute a client application associated with the host application.

60. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

61. The method of the previous embodiment, further comprising, at the base station, transmitting the user data.

62. The method of the previous 2 embodiments, wherein the user data is provided at the host computer by executing a host application, the method further comprising, at the UE, executing a client application associated with the host application.

63. A user equipment (UE) configured to communicate with a base station, the UE comprising a radio interface and processing circuitry configured to performs any of the previous 3 embodiments.

64. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

65. The communication system of the previous embodiment, wherein the cellular network further includes a base station configured to communicate with the UE.

66. The communication system of the previous 2 embodiments, wherein:
the processing circuitry of the host computer is configured to execute a host application, thereby providing the user data; and the UE's processing circuitry is configured to execute a client application associated with the host application.

67. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs any of the steps of any of the Group A embodiments.

68. The method of the previous embodiment, further comprising at the UE, receiving the user data from the base station.

69. A communication system including a host computer comprising:
   communication interface configured to receive user data originating from a transmission from a user equipment (UE) to a base station,
   wherein the UE comprises a radio interface and processing circuitry, the UE's processing circuitry configured to perform any of the steps of any of the Group A embodiments.

70. The communication system of the previous embodiment, further including the UE.

71. The communication system of the previous 2 embodiments, further including the base station, wherein the base station comprises a radio interface configured to communicate with the UE and a communication interface configured to forward to the host computer the user data carried by a transmission from the UE to the base station.

72. The communication system of the previous 3 embodiments, wherein:
   the processing circuitry of the host computer is configured to execute a host application; and
   the UE's processing circuitry is configured to execute a client application associated with the host application, thereby providing the user data.

73. The communication system of the previous 4 embodiments, wherein:
   the processing circuitry of the host computer is configured to execute a host application, thereby providing request data; and
   the UE's processing circuitry is configured to execute a client application associated with the host application, thereby providing the user data in response to the request data.

74. A method implemented in a communication system including a host computer, a base station and a user equipment (UE), the method comprising:
   at the host computer, receiving user data transmitted to the base station from the UE, wherein the UE performs any of the steps of any of the Group A embodiments.

75. The method of the previous embodiment, further comprising, at the UE, providing the user data to the base station.

76. The method of the previous 2 embodiments, further comprising:
   at the UE, executing a client application, thereby providing the user data to be transmitted; and
   at the host computer, executing a host application associated with the client application.

77. The method of the previous 3 embodiments, further comprising:
   at the UE, executing a client application; and
   at the UE, receiving input data to the client application, the input data being provided at the host computer by executing a host application associated with the client application,
   wherein the user data to be transmitted is provided by the client application in response to the input data.

78. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

79. The communication system of the previous embodiment further including the base station.

80. The communication system of the previous 2 embodiments, further including the UE, wherein the UE is configured to communicate with the base station.

81. The communication system of the previous 3 embodiments, wherein:
   the processing circuitry of the host computer is configured to execute a host application;
   the UE is configured to execute a client application associated with the host application, thereby providing the user data to be received by the host computer.

82. A method implemented in a communication system including a host computer, a base station and a user equipment (UE), the method comprising:
   at the host computer, receiving, from the base station, user data originating from a transmission which the base station has received from the UE, wherein the UE performs any of the steps of any of the Group A embodiments.

83. The method of the previous embodiment, further comprising at the base station, receiving the user data from the UE.

84. The method of the previous 2 embodiments, further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

CBRA Contention Based Random Access
CFRA Contention Free Random Access
CQI Channel Quality Indicator
CRI CSI-RS Resource Indicator
CSI Channel State Information
CSI-IM interference measurement resource for CSI feedback
DCI Downlink Control Information
LCID Logical Channel Indicator
LI Layer Indicator
MA Multiple Access
MCS Modulation and Coding Scheme
NW Network
NZP Non-Zero Power
PDU Protocol Data Unit
QCL Quasi Co-Located RA Random Access
RAR Random Access Response
RE Resource Element
RI Rank Indicator
RO RACH Occasion/Random Access Occasion
SIB1 System Information Block Type 1
SINR Signal to Interference plus Noise Ratio
SIP Session Initiation Protocol
SSB SS/PBCH Block
SSBRI SS/PBCH Block Resource Indicator
TB Transport Block
TCI Transmission Configuration Indicator
ZP Zero Power
1× RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival UTRA Universal Terrestrial Radio Access
UTRAN Universal Terrestrial Radio Access Network
WCDMA Wide CDMA
WLAN Wide Local Area Network

The invention claimed is:

1. A method performed by a wireless device, the method comprising:

performing measurements of one or more reference signals transmitted by a base station;

sending a first message to the base station in a Physical Uplink Shared Channel (PUSCH), wherein the first message comprises a Channel State Information (CSI) report comprising information based on the measurements of the one or more reference signals; and receiving a second message from the base station in a Physical Downlink Control Channel (PDCCH), wherein the second message requests a CSI report and/or activates an aperiodic CSI reference signal (CSI-RS) resource configuration;

wherein the first message is a Msg3 PUSCH or a MsgA PUSCH or a Msg5 PUSCH, and/or the second message is a Msg4 PDCCH.

2. The method of claim 1, wherein the information in the CSI report comprises a Synchronization Signal/Physical Broadcast Channel Block Resource Indicator (SSBRI) and/or a Channel State Information Reference Signal Resource Indicator (CRI).

3. The method of claim 2, wherein a bit length of the SSBRI is related to a number of reference signals transmitted by the base station.

4. The method of claim 2, wherein a number of L1-RSRP measurements in the CSI report is less than a number of SSBRI and/or CRI in the CSI report.

5. The method of claim 2, wherein, if a number of reported signals equals a number of reference signals, or if all reference signals in a RA occasion associated with a preamble are to be reported, the information in the CSI report comprises RSRPs of the reference signals in increasing reference signal index.

6. The method of claim 1, wherein the method performed by the wireless device in the RA procedure further comprises, prior to sending the first message:

sending a third message to the base station, wherein the third message comprises a first preamble selected from a set of preambles.

7. The method of claim 1, wherein the method performed by the wireless device further comprises, prior to sending the first message:

receiving a random access (RA) response message from the base station, wherein the RA response message provides an uplink grant for sending the first message.

8. The method of claim 7, wherein the RA response message further comprises (i) an indication of a number of reference signals that the wireless device is to provide information for in the CSI report; and/or (ii) an indication of one or more parameters to be measured by the wireless device and included in the CSI report.

9. The method of claim 1, wherein the method performed by the wireless device further comprises:

receiving a RA response message from the base station, wherein the RA response message is a response to the first message.

10. A method performed by a base station, the method comprising:

receiving a first message from a wireless device in a Physical Uplink Shared Channel (PUSCH), wherein the first message comprises a Channel State Information (CSI) report comprising information for one or more reference signals transmitted by the base station; and sending a second message to the wireless device in a Physical Downlink Control Channel (PDCCH), wherein the second message requests a CSI report and/or activates an aperiodic CSI reference signal (CSI-RS) resource configuration;

wherein the first message is a Msg3 PUSCH or a MsgA PUSCH or a Msg5 PUSCH, and/or the second message is a Msg4 PDCCH.

11. The method of claim 10, wherein the information in the CSI report comprises a Synchronization Signal/Physical Broadcast Channel Block Resource Indicator (SSBRI) and/or a Channel State Information Reference Signal Resource Indicator (CRI).

12. The method of claim 11, wherein a bit length of the SSBRI is related to a number of reference signals transmitted by the base station.

13. The method of claim 11, wherein a number of L1-RSRP measurements in the CSI report is less than a number of SSBRI and/or CRI in the CSI report.

14. The method of claim 11, wherein, if a number of reported signals equals a number of reference signals, or if all reference signals in a random access (RA) occasion associated with a preamble are to be reported, the information in the CSI report comprises RSRPs of the reference signals in increasing reference signal index.

15. The method of claim 10, wherein the method further comprises:

broadcasting a System Information Block, SIB, wherein the SIB comprises a list of information for the wireless device to include in a CSI report.

16. The method of claim 10, wherein the method performed by the base station further comprises, prior to receiving the first message:

receiving a third message from the wireless device, wherein the third message comprises a first preamble selected from a set of preambles.

17. The method of claim 10, wherein the method performed by the base station further comprises, prior to receiving the first message:

sending a random access (RA) response message to the wireless device, wherein the RA response message provides an uplink grant to the wireless device for sending the first message.

18. The method of claim 17, wherein the RA response message further comprises (i) an indication of a number of reference signals that the wireless device is to provide information for in the CSI report; and/or (ii) an indication of one or more parameters to be measured by the wireless device and included in the CSI report.

19. The method of claim 17, wherein the RA response message further comprises an indication that delaying the sending of the first message is permitted, so as to enable the wireless device to perform measurements of the one or more reference signals.

20. The method of claim 10, further comprising:

evaluating the information in the CSI report for one or more reference signals to determine one or more of: (i) uplink and/or downlink beams to use for subsequent transmissions between the base station and the wireless device; (ii) a modulation and coding scheme (MCS); (iii) a transport block (TB) scaling factor; and (iv) a Physical Downlink Control Channel (PDCCH) aggregation level; and sending to the wireless device, in a PDCCH, an indication of a beam that the wireless device is to use for receiving information in a Physical Downlink Shared Channel (PDSCH) from the base station.

21. The method of claim 10, wherein the method performed by the base station further comprises:

sending a random access (RA) response message to the wireless device, wherein the RA response message is a response to the first message.

22. The method of claim 21, further comprising:

evaluating the information in the CSI report for one or more reference signals to determine one or more of: (i) uplink and/or downlink beams to use for subsequent transmissions between the base station and the wireless device; (ii) a modulation and coding scheme (MCS); (iii) a transport block (TB) scaling factor; and (iv) a Physical Downlink Control Channel, (PDCCH) aggregation level; and wherein the RA response message is sent in a PDCCH, wherein the RA response message indicates a beam that the wireless device is to use for receiving information in a Physical Downlink Shared Channel (PDSCH) from the base station.

23. A wireless device, the wireless device comprising:

power supply circuitry configured to supply power to the wireless device; and processing circuitry configured to:

perform measurements of one or more reference signals transmitted by a base station;

send a first message to the base station in a Physical Uplink Shared Channel (PUSCH), wherein the first message comprises a Channel State Information (CSI) report comprising information based on the measurements of the one or more reference signals; and receive a second message from the base station in a Physical Downlink Control Channel (PDCCH), wherein the second message requests a CSI report and/or activates an aperiodic CSI reference signal (CSI-RS) resource configuration;

wherein the first message is a Msg3 PUSCH or a MsgA PUSCH or a Msg5 PUSCH, and/or the second message is a Msg4 PDCCH.

24. A base station, the base station comprising:

power supply circuitry configured to supply power to the base station; and processing circuitry configured to:

receive a first message from the wireless device in a Physical Uplink Shared Channel (PUSCH), wherein the first message comprises a Channel State Information (CSI) report comprising information for one or more reference signals transmitted by the base station;

send a second message to the wireless device in a Physical Downlink Control Channel PDCCH), wherein the second message requests a CSI report and/or activates an aperiodic CSI reference signal (CSI-RS) resource configuration;

wherein the first message is a Msg3 PUSCH or a MsgA PUSCH or a Msg5 PUSCH, and/or the second message is a Msg4 PDCCH.

* * * * *